United States Patent [19]
Ide et al.

[11] Patent Number: 5,598,187
[45] Date of Patent: Jan. 28, 1997

[54] SPATIAL MOTION PATTERN INPUT SYSTEM AND INPUT METHOD

[75] Inventors: Yuji Ide, Yokohama; Kazuhiro Takashima, Tokyo; Toshihiro Morohoshi, Ichikawa; Tomiyoshi Fukumoto, Kawasaki, all of Japan

[73] Assignee: Kabushiki Kaisha Toshiba, Kawasaki, Japan

[21] Appl. No.: 242,429

[22] Filed: May 13, 1994

[30] Foreign Application Priority Data

May 13, 1993 [JP] Japan ................................. 5-111856

[51] Int. Cl.$^6$ .................................................. G09G 3/02
[52] U.S. Cl. .......................... 345/158; 345/156; 345/179
[58] Field of Search .................................. 345/156, 157, 345/158, 161, 163, 165, 167, 168, 145, 179; 178/18, 19; 359/142, 146; 348/734

[56] References Cited

U.S. PATENT DOCUMENTS

| 5,121,442 | 6/1992 | Togawa et al. | 345/156 |
| 5,287,119 | 2/1994 | Drumm | 345/158 |
| 5,339,095 | 8/1994 | Redford | 345/158 |
| 5,353,042 | 10/1994 | Klapman et al. | 345/158 |

FOREIGN PATENT DOCUMENTS

| 0372674 | 6/1990 | European Pat. Off. | 345/158 |
| 6421522 | 1/1989 | Japan . | |
| 3192423 | 8/1991 | Japan . | |
| 47726 | 1/1992 | Japan . | |
| 4180119 | 6/1992 | Japan . | |

*Primary Examiner*—Kee M. Tung
*Assistant Examiner*—Doon Chow
*Attorney, Agent, or Firm*—Oblon, Spivak, McClelland, Maier & Neustadt, P.C.

[57] ABSTRACT

A spatial motion pattern input system for causing a control target device to perform control according to a spatial motion pattern of a spatial control input device, comprises a move sensing section for sensing at least the amount of movements of the spatial control input device on two axes among the amount of movements of the device on three specific nonparallel axes in space, a conversion section for converting the amount of spatial movements composed of at least two amounts sensed at the move sensing section into a motion vector sequence, an identification section for performing identification by comparing a motion vector sequence corresponding to a basic motion pattern previously entered with the motion vector sequence, and an execution section for controlling the control target device on the basis of the recognition result from the identification section.

20 Claims, 20 Drawing Sheets

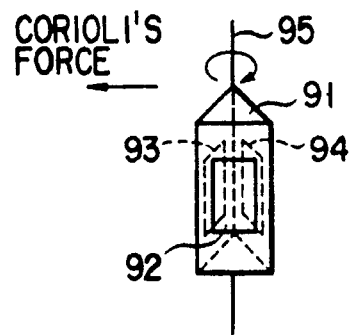
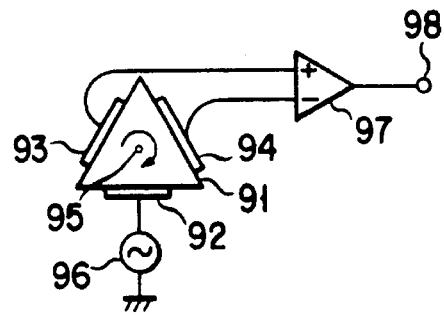
FIG. 9A          FIG. 9B
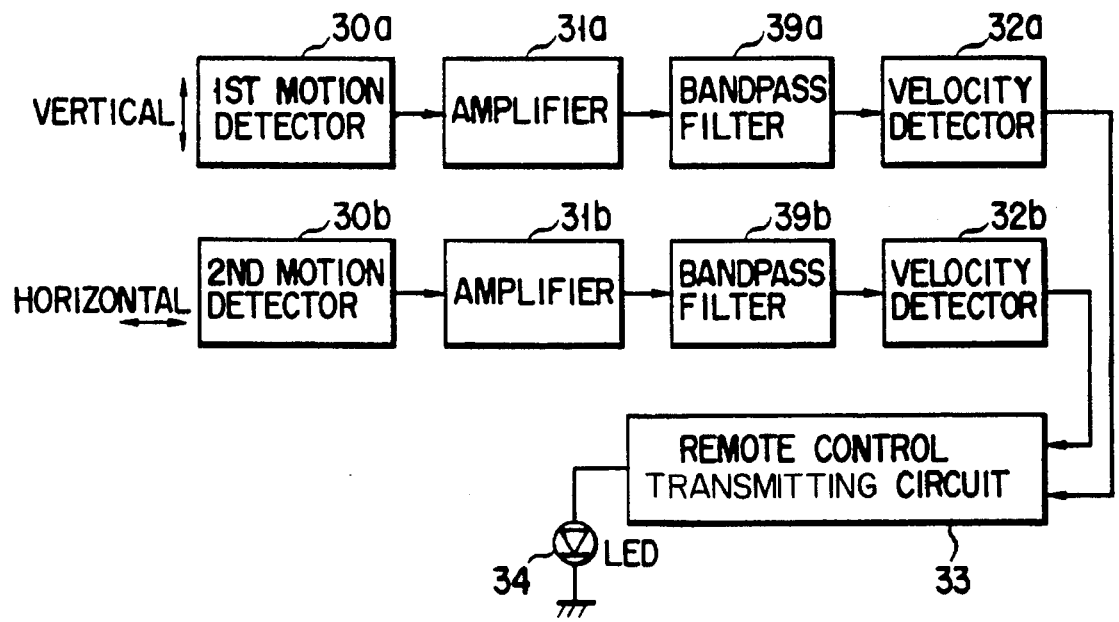
FIG. 10

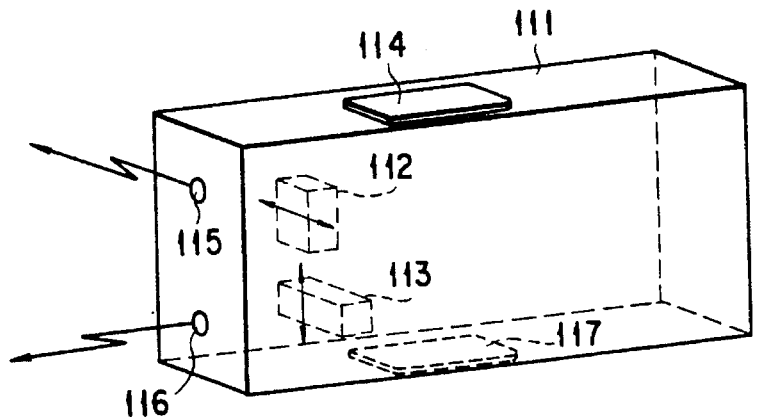
F I G. 11
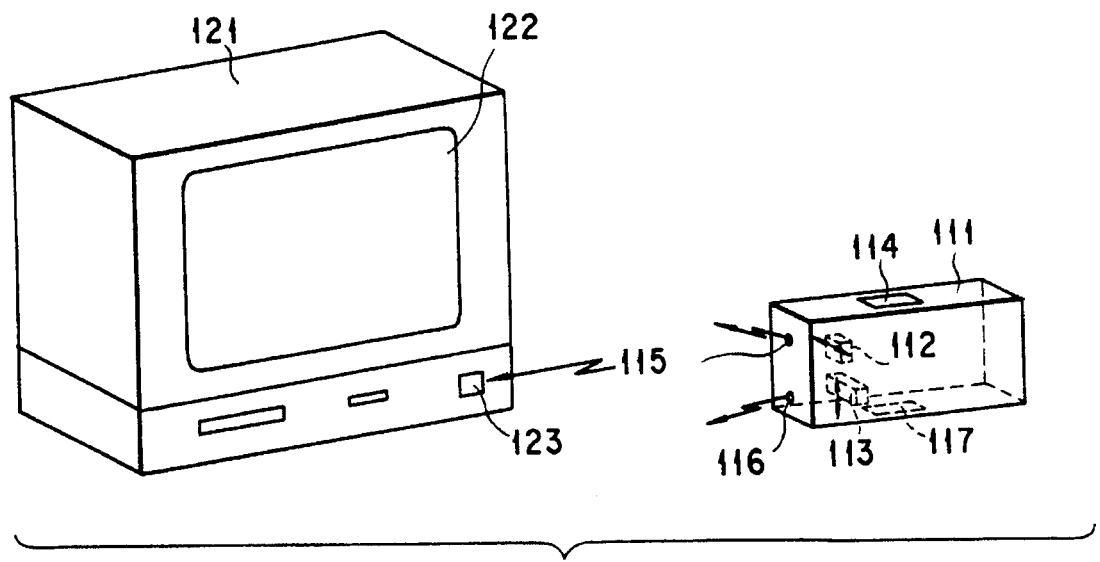
F I G. 12

| TYPE \ STEP | OPERATION OF MOUSE WITH TWO BUTTONS | | OPERATION OF MOUSE WITH A BUTTON | | SCREEN RESPONSE |
|---|---|---|---|---|---|
| | TYPE 1 | TYPE 2 | TYPE 3 | TYPE 4 | |
| 1 | PRESS CURSOR BUTTON (A) | CONTINUE PRESSING CURSOR BUTTON (A) | CLICK ONCE | CONTINUE PRESSING CLICK BUTTON | DISPLAY OF CURSOR ETC. |
| 2 | MOUSE MOVE OPERATION | | | | CURSOR MOVEMENT ETC. |
| 3 | PRESS CLICK BUTTON (B) | PRESS CLICK BUTTON (B) | CLICK MORE THAN ONCE (E.G. TWICE) | RELEASE CLICK BUTTON | (SELECTION) |
| 4 | PRESS CURSOR BUTTON (A) | RELEASE CURSOR BUTTON (A) | CLICK ONCE | — | ERASURE OF CURSOR ETC. |

FIG. 14

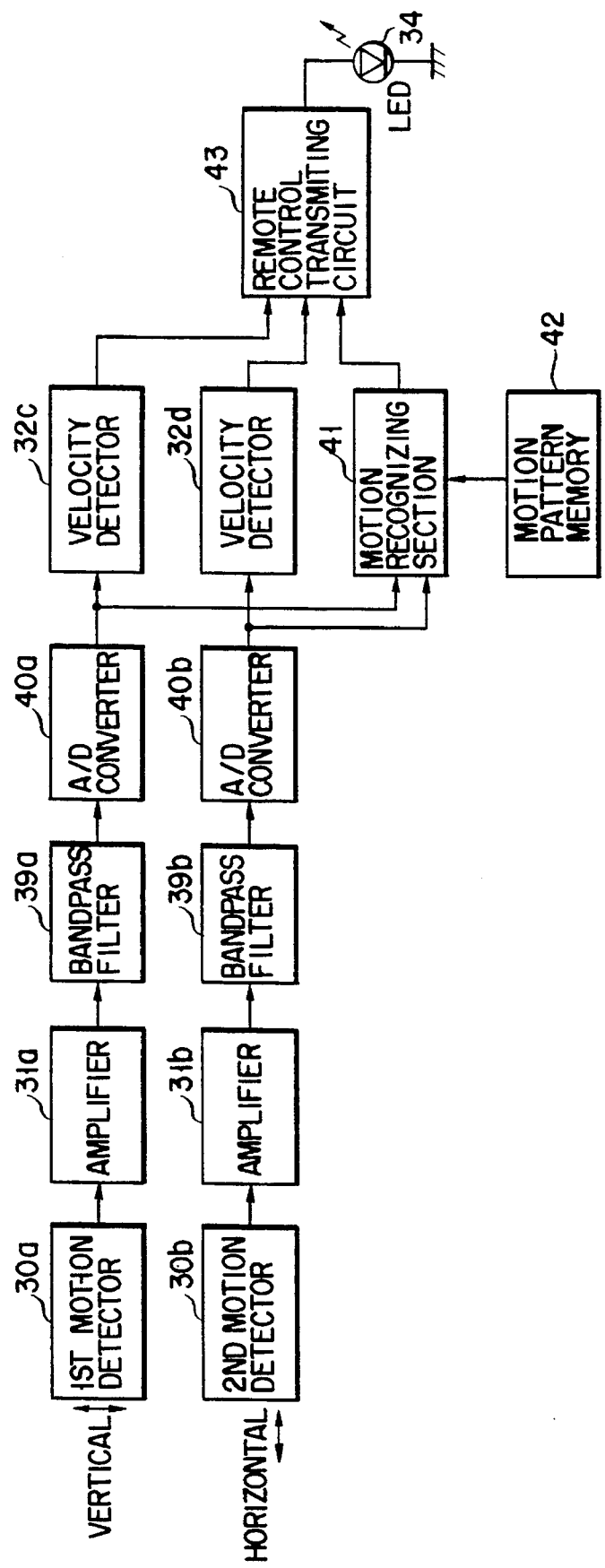
F I G. 15

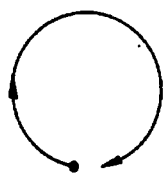
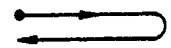
FIG. 16A    FIG. 16B    FIG. 16C
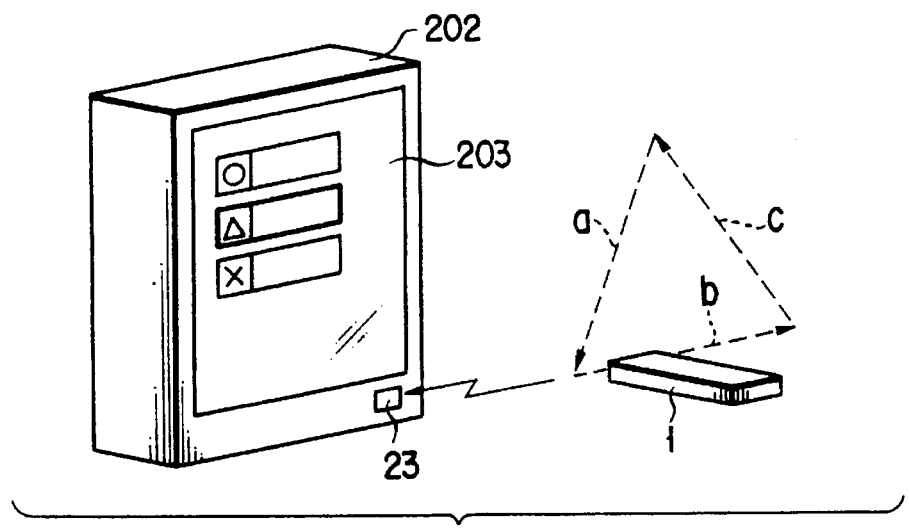
FIG. 17
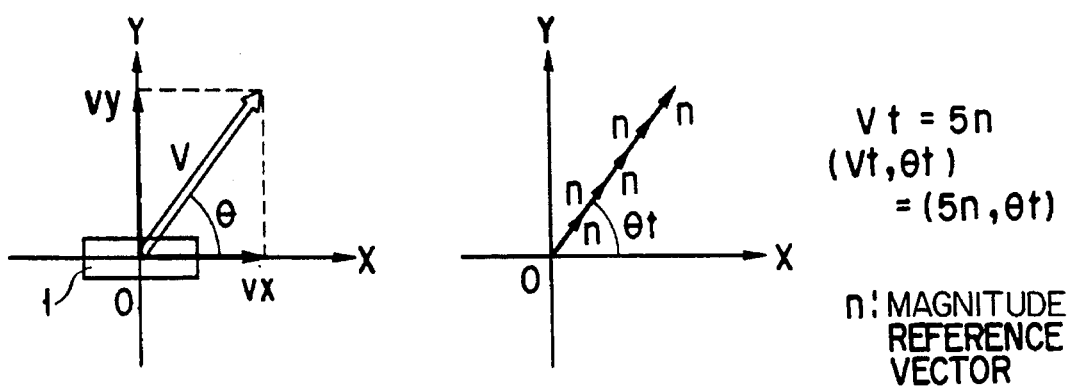
$Vt = 5n$
$(Vt, \theta t)$
$= (5n, \theta t)$
n: MAGNITUDE REFERENCE VECTOR
FIG. 18A    FIG. 18B

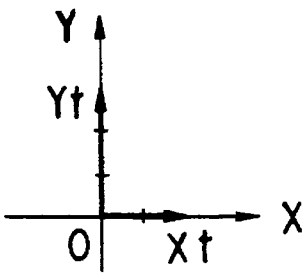
FIG. 22A
SENSED MOVE AMOUNT   Xt=2
                     Yt=3
SPECIFIED VALUE         VECTOR TABLE
| V TABLE | | X | | | | θ TABLE | | X | | | |
|---|---|---|---|---|---|---|---|---|---|---|---|
| | 1 | ② | 3 | 4···| | | 1 | ② | 3 | 4··· |
| 1 | V11 | V21 | V31 | --- | | 1 | θ11 | θ21 | θ31 | --- |
| 2 | V12 | V22 | V32 | --- | | 2 | θ12 | θ22 | θ32 | --- |
| Y ③ | V13 | <u>V23</u> | V33 | --- | Y ③ | θ13 | <u>θ23</u> | θ33 | --- |
| 4 | | | | | | 4 | | | | |
MOTION VECTOR (Vt, θt) = (V23, θ23)
FIG. 22B
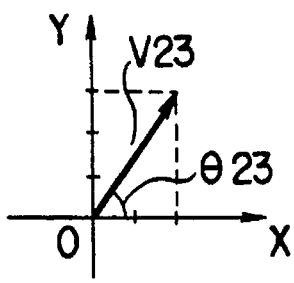
FIG. 22C

EXAMPLE OF SPATIAL MOVEMENT

UNIT VECTOR PLANE

SPATIAL MOVEMENT

SPATIAL MOVEMENT

VECTOR ADDITION

VECTOR ADDITION

WHOLE MOVEMENT

ENTERED PATTERN (CORRESPONDING TO CIRCLE)

EXAMPLE OF MOTION VECTOR SEQUENCE

UNIT VECTOR FUNCTION

VECTOR PATTERN (CORRESPONDING TO CIRCLE)

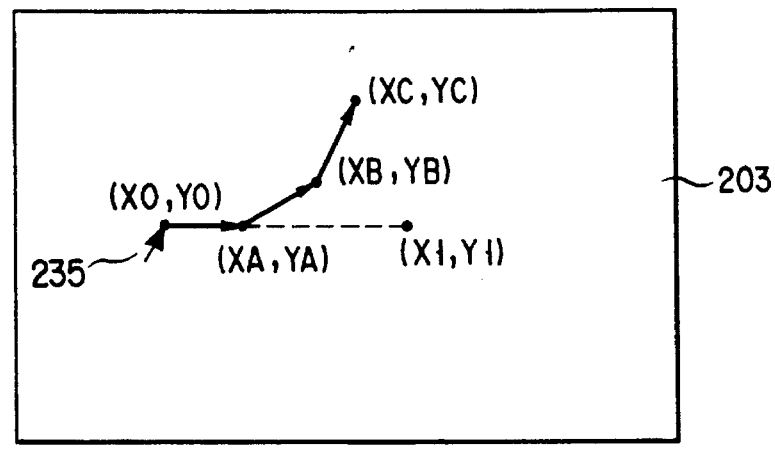
FIG. 28A
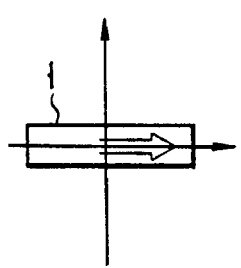   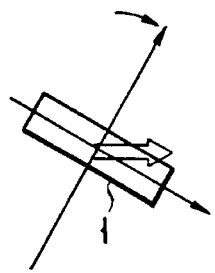   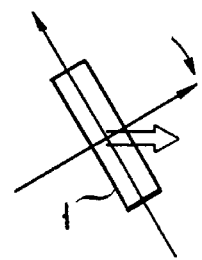
FIG. 28B    FIG. 28C    FIG. 28D
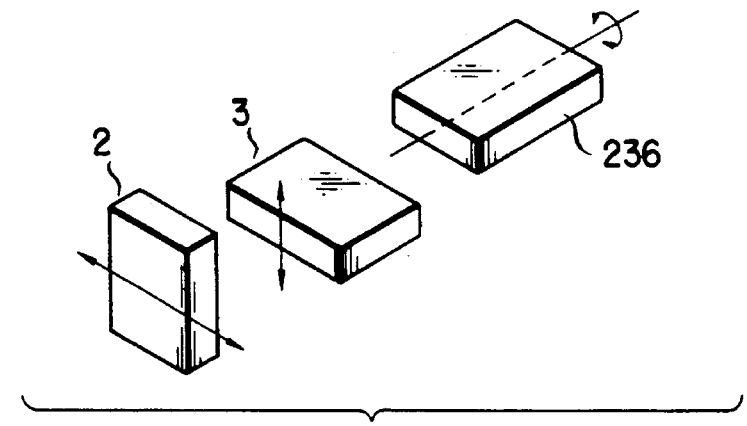
FIG. 29

| SENSED AMOUNT | | | MOTION VECTOR | | |
|---|---|---|---|---|---|
| X | Y | Z | V | $\theta$ | $\psi$ |
| 1 | 1 | 1 | V111 | $\theta$111 | $\psi$111 |
| 2 | 1 | 1 | V211 | $\theta$211 | $\psi$211 |
| 3 | 1 | 1 | V311 | $\theta$311 | $\psi$311 |
| ⋮ | ⋮ | ⋮ | ⋮ | ⋮ | ⋮ |
| 1 | 2 | 1 | V121 | $\theta$121 | $\psi$121 |
| 1 | 3 | 1 | V131 | $\theta$131 | $\psi$131 |
| ⋮ | ⋮ | ⋮ | ⋮ | ⋮ | ⋮ |
| 1 | 1 | 2 | V112 | $\theta$112 | $\psi$112 |
| 1 | 1 | 3 | V113 | $\theta$113 | $\psi$113 |
| ⋮ | ⋮ | ⋮ | ⋮ | ⋮ | ⋮ |

FIG. 35C  $\boxed{1}$ , $\boxed{2}$ , ---- : VALUE

FIG. 35D  $\boxed{A}$ , $\boxed{B}$ , ---- : CHARACTER

FIG. 35E  $\boxed{\bigcirc}$ , $\boxed{\triangle}$ , ---- : SYMBOL

FIG. 35F  $\boxed{Yes}$ , $\boxed{No}$ , ---- : JUDGMENT, SELECTION

FIG. 35G  $\boxed{\leftarrow}$ , $\boxed{\updownarrow}$ , ---- : CURSOR CONTROL ENABLE DIRECTION

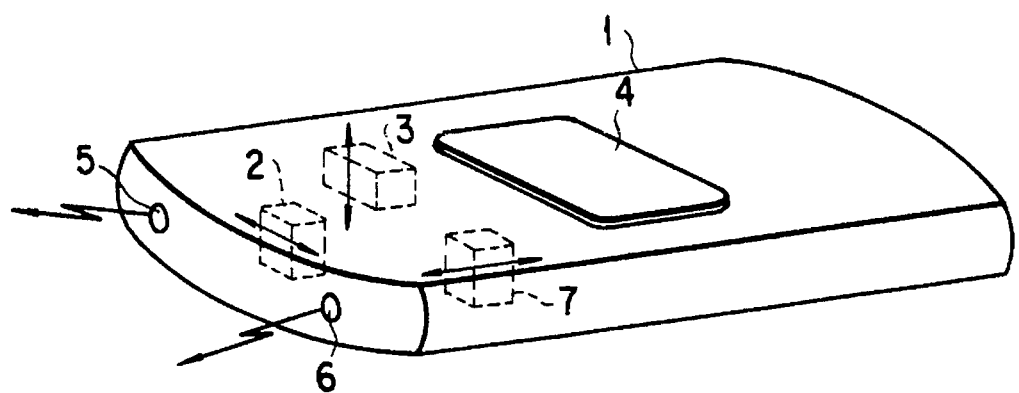
F I G. 36
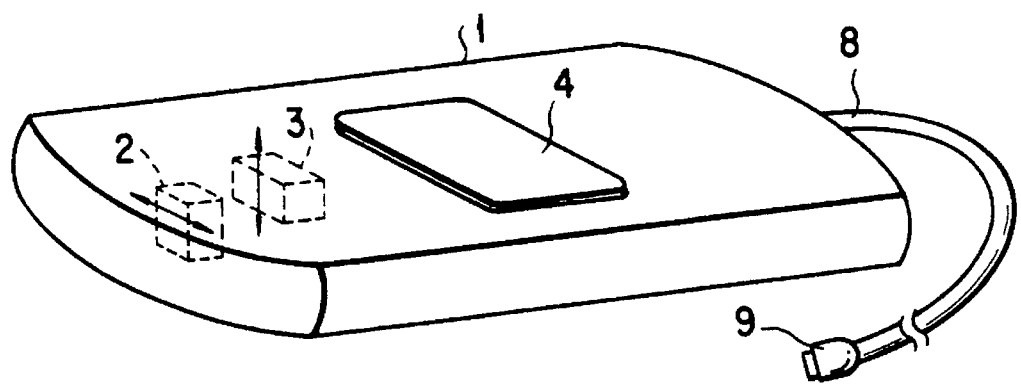
F I G. 37

SPATIAL MOTION PATTERN INPUT SYSTEM AND INPUT METHOD

BACKGROUND OF THE INVENTION

1. Field of the Invention

This invention relates to an input device used with a computer or multimedia equipment, and more particularly to a three-dimensional input device such as a spatial control mouse for providing a higher operability, man-machine interface environment. Additionally, it relates to a spatial motion pattern input system for realizing an extended input function based on the operator's motion pattern by using a three-dimensional input device.

2. Description of the Related Art

Recently, the so-called mouse, a pointing device, has been widely used as an input device for a man-machine interface used with computers and various computer-based systems.

With a system using a mouse, the operator moves the mouse on the desk to move the cursor interlocking with the mouse movement to the desired object (an image, a character, etc.) appearing on the display. With the cursor positioned over the desired object on the display, he clicks (or releases) an acknowledge switch called a click button of the mouse to enter data to the system. In this way, the mouse offers a better operability not found with the keyboard.

However, since the conventional mouse must be moved in contact with the operation surface such as a dedicated operation board and, in addition, has a connecting cable between the computer and the mouse, this has impaired the operability seriously. Specifically, the operator has been unable to carry out a pointing operation by allowing an arbitrary distance between the mouse and the control target device such as a computer in a given space or any imaginary plane.

Furthermore, since the mouse movement is restricted to the aforementioned operation surface, the mouse can sense the movements only on the plane and cannot spatial movements. Therefore, it is difficult to perform a pointing operation reflecting the spatial mouse movements.

Taking the situation into account, such a three-dimensional input device (Jpn. Pat. Appln. KOKAI Publication No. 3-192423) has recently been developed as a spatial control mouse which senses the operator's three-dimensional movements to enable pointer operation in any plane and even spatial pointer operation, thereby allowing the operator to move the pointer easily even if he is away from the computer, the multimedia device, or their display unit.

With a system using the three-dimensional input device, however, a pointing operation is mostly effected as follows. The operator moves the three-dimensional input device in space to move the cursor interlocking with the movement of the input device to the desired object on the screen, and then presses (or releases) the click button to acknowledge or select the object.

Other systems (Jpn. Pat. Appln. KOKAI Publication No. 4-7726 and Jpn. Pat. Appln. KOKAI Publication No. 4-180119) have been proposed which can execute a function allocated to each pattern by moving a conventional mouse on the operation surface to draw a specific pattern.

With those systems, however, since the mouse must be moved on the operation surface, only simple patterns can be drawn. Furthermore, it is relatively difficult to draw a specific pattern neatly on the operation surface. Thus, by the pattern matching method, the patterns drawn by the operator sometimes cannot be recognized.

SUMMARY OF THE INVENTION

Accordingly, the object of the present invention is to provide a spatial motion pattern input device which can recognize the operator's spatial motion pattern in space to control a computer or multimedia equipment according to the spatial motion pattern, or offer a sensuous man-machine interface environment, in an input system using a three-dimensional input device such as a spatial control mouse enabling pointer operation in any imaginary plane and even spatial pointer operation.

The foregoing object is accomplished by providing a spatial motion pattern input system for causing a control target device to perform control according to a spatial motion pattern of a spatial control input device, comprising: a move sensing section for sensing at least the amount of movements of the spatial control input device on two axes among the amount of movements of the device on three specific nonparallel axes in space; a conversion section for converting the amount of spatial movements composed of at least two amounts sensed at the move sensing section into a motion vector sequence; an identification section for performing identification by comparing a motion vector sequence corresponding to a basic motion pattern previously entered with the motion vector sequence; and an execution section for controlling the control target device on the basis of the recognition result from the identification section.

Preferably, the identification section contains: a unit vector processing section for generating a unit vector function on the basis of a motion vector sequence obtained from the amount of movement of the spatial control input device and/or an addition vector processing section for generating a cumulative vector function on the basis of a motion vector sequence obtained from the amount of movement of the spatial control input device; and an identification section for comparing the generated unit vector function with a unit vector function obtained from a motion vector sequence corresponding to a basic motion pattern and/or comparing the generated cumulative vector function with a cumulative vector function obtained from a motion vector sequence corresponding to a basic motion pattern, and then on the basis of these comparison results, identifying the spatial motion pattern of the spatial control input device.

It is also preferable that the conversion section should contain a conversion table in which the number of unit vectors and angles are entered for the amount of spatial movements, and obtains the result of converting the amount of spatial movements into a motion vector sequence by giving the values obtained by sampling in time the amount of spatial movement composed of at least two amounts sensed at the move sensing section, to the conversion table one after another as specified values.

The foregoing object is also accomplished by providing a spatial control input device for sensing spatial motion patterns to cause a control target device to perform control according to a spatial motion pattern drawn by the operator, comprising: a move sensing section for sensing at least the amount of movements of the spatial control input device on two axes of the amount of movements of the device on three specific nonparallel axes in space; a conversion section for converting the amount of spatial movements composed of at least two amounts sensed at the move sensing section into a motion vector sequence; an identification section for performing identification by comparing a motion vector sequence corresponding to a basic motion pattern previously entered with the motion vector sequence; and a transmission section for transmitting the recognition result from the identification section to the control target device.

The foregoing object is still accomplished by providing a spatial motion pattern input method for causing a control target device to perform control according to spatial motion patterns of a spatial control input device, comprising: the move sensing step of sensing at least the amount of movements of the spatial control input device on two axes of the amount of movements of the device on three specific non-parallel axes in space; the conversion step of converting the amount of spatial movements composed of at least two amounts sensed at the move sensing step into a motion vector sequence; the identification step of performing identification by comparing a motion vector sequence corresponding to a basic motion pattern previously entered with the motion vector sequence; and the execution step of controlling the control target device on the basis of the recognition result from the identification section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9A is a perspective view of an angular velocity detector using a piezoelectric vibration gyroscope;

FIG. 9B is a drawing to help explain the operating principle of the angular velocity detector using a piezoelectric vibration gyroscope;

FIG. 10 is a schematic diagram of a spatial control mouse with a hand-movement correction section;

FIG. 11 schematically shows the configuration of a spatial control mouse according to a second embodiment of the present invention;

FIG. 12 is a conceptual use diagram of a spatial control image system using the mouse of FIG. 11;

FIG. 14 is a table to help explain various clicking operations in the first and second embodiments;

FIG. 15 is a schematic block diagram of a spatial control mouse according to a third embodiment of the present invention;

FIG. 16A is a drawing to help explain a sensed motion pattern;

FIG. 16B is a drawing to help explain another sensed motion pattern;

FIG. 16C is a drawing to help explain still another sense motion pattern;

FIG. 17 shows a motion pattern input method according to a fourth embodiment of the present invention;

FIG. 18A is a drawing to help explain the concept of a motion vector;

FIG. 18B is a drawing to help explain the concept of a motion vector;

FIG. 22A shows movements in two direction before conversion into a motion vector;

FIG. 22B shows an example of converting a spatial movement into a motion vector using a vector table;

FIG. 22C shows the result of converting sensed movements in two directions into a motion vector;

FIG. 28A is a drawing to help explain the process of correcting the amount sensed at the movement sensing section;

FIG. 28B is a drawing to help explain the process of correcting the amount sensed at the movement sensing section;

FIG. 28C is a drawing to help explain the process of correcting the amount sensed at the movement sensing section;

FIG. 28D is a drawing to help explain the process of correcting the amount sensed at the movement sensing section;

FIG. 29 schematically shows an example of the installation position of a rotation amount sensing element;

FIGS. 35C to 35G show other modifications of the cursor after recognition by motion pattern input;

FIG. 36 shows the configuration of a spatial control mouse according to a fifth embodiment of the present invention; and FIG. 37 shows the configuration of a spatial control mouse according to a sixth embodiment of the present invention.

DETAILED DESCRIPTION OF THE PREFERRED EMBODIMENTS

Hereinafter, referring to the accompanying drawings, embodiments of the present invention will be explained.

Figure 1:
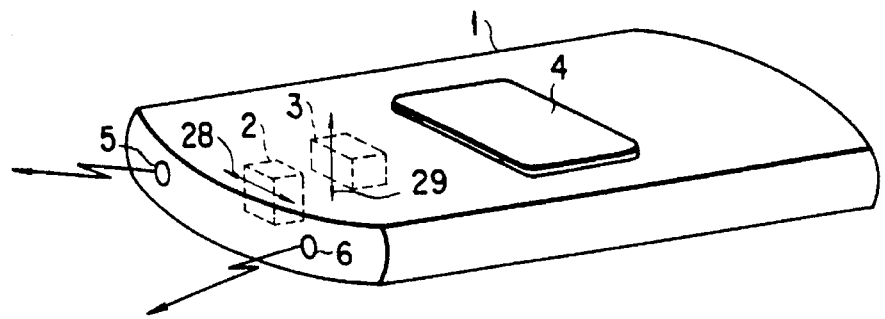
FIG. 1 is a schematic view of a spatial control mouse according to a first embodiment of the present invention.
Figure 2:
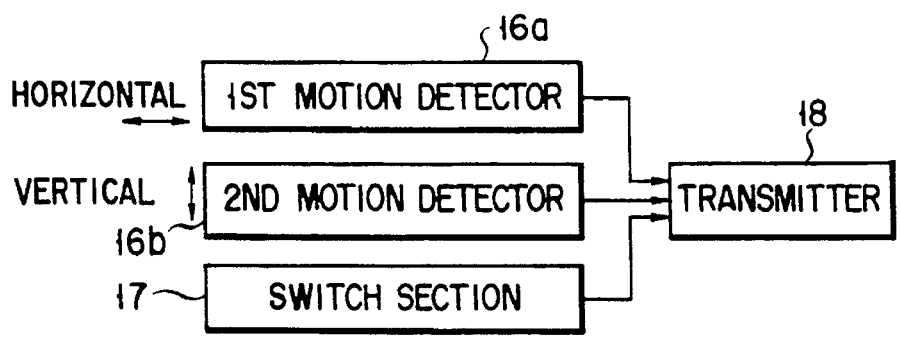
FIG. 2 is a schematic block diagram of the spatial control mouse of the first embodiment.

FIG. 1 is a schematic view of a spatial control mouse according to a first embodiment of the present invention. FIG. 2 is a schematic block diagram of the spatial control mouse. In this specification, it is assumed that the horizontal direction means the right and left directions when viewed from the spatial control mouse as shown by arrow 28 in FIG. 1, and the vertical direction means the upward and downward directions when viewed from the mouse as shown by arrow 29.

The spatial control mouse of the present invention comprises: a first motion detector 16a for sensing horizontal movements, a second motion detector 16b for sensing vertical movements, a switch section 17 for the operator to click, and a transmitter 18 for transmitting the output of the first motion detector 16a, that of the second motion detector 16b, and that of the switch section 17 to a control target device.

The first motion detector 16a contains a horizontal move sensing element 2 for sensing horizontal movements. The second motion detector 16b contains a vertical move sensing element 3 for sensing vertical movements. The switch section 17 contains a click button 4. The transmitter 18 contains infrared light-emitting elements 5, 6.

The operator holds the spatial control mouse body 1 in his hand and moves the body 1 in an arbitrary space up and down or from side to side. Specifically, the operator moves the body 1 in an imaginary plane without using a real standard surface such as a desk or a lattice reflection board. The movement of the body 1 is sensed by the horizontal and vertical move sensing elements 2 and 3 made up of piezoelectric elements etc., which break down the movement into movements in two directions, horizontal (from right and left) and vertical (up and down). The sensed movements in two directions, such as acceleration or angular velocity, are either converted by the motion detectors 16a, 16b into specific move signals (e.g., signals indicating the speed of the mouse, the moving distance, etc.) and then outputted, or directly outputted in the form of acceleration or angular velocity. The transmitter 18 performs the necessary processes (e.g., format conversion, coding, multiplexing, modulation) on the two move signals. Thereafter, the transmitter 18 drives the infrared light-emitting elements 5, 6 to transmit the signals to the control target device.

The operator uses such a spatial control mouse to position the cursor on the screen. He clicks (or releases) the click button 4 of the switch section 17 before and/or after the positioning. The transmitter 18 tells the control target device that the click button 4 is pressed (or released). When receiving the movement signal or the signal indicating the click action, the control target device executes a particular operation according to those signals.

It is desirable for the light-emitting elements 5 and 6 to radiate infrared rays to the right-side space and to the left-side space, respectively, or allocate different directivity to each of these elements, because this widens the radiating range of infrared rays. Particularly in the case of a spatial control mouse used in an arbitrary space, even if the operator swings the mouse from side to side, he can transmit infrared rays to the control target device reliably. Of course, the number of light-emitting elements may be one or more than two, depending on the applications.

In the embodiment of FIG. 1, the mouse is provided with the movement sensing elements for sensing movements along two axes, the vertical and horizontal directions. Instead, the mouse may be provided with two move sensing elements for sensing movements in the direction (backward and forward) perpendicular to the vertical and horizontal directions and movements in the vertical direction, or two move sensing elements for sensing backward and forward movements and horizontal movements. The directions of two axes sensed may not be at right angles to each other as long as they are not parallel. This holds true for the embodiments described later.

Figure 3:
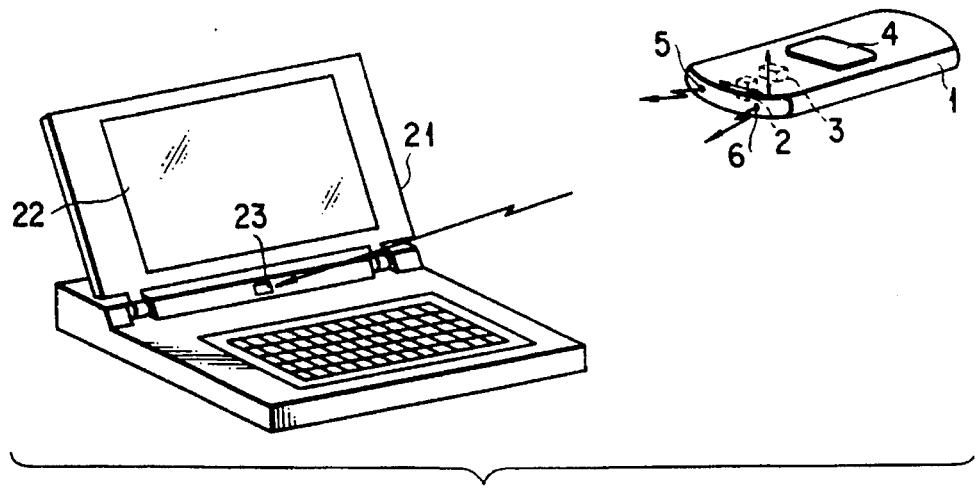
FIG. 3 is a conceptual use diagram of a spatial operation-type computer system using the mouse of FIG. 1.

FIG. 3 is a conceptual use diagram of a spatial control computer system where a spatial control mouse of the embodiment is applied to a laptop computer 21.

With the invention, a special or a restricted working environment is not necessary to operate the mouse. Specifically, the operator has only to hold the mouse body 1 in his hand and move it up and down and from side to side in an arbitrary space (e.g., in the space just in front of him). These movements are sensed by the horizontal move sensing element 2 and the vertical move sensing element 3 as described above. Then, the control signals according to the sensed movements are radiated from the infrared light-emitting elements 5, 6 to the laptop computer 21, and then received by an infrared light-receiving element 23. Similarly, the control signal indicating click actions is transmitted from the mouse to the laptop computer 21.

The laptop computer 21 obtains the amount of movement of the mouse according to the received control signal or by a specific arithmetic process based on the control signal, and then controls the movement of the cursor on the screen 22. If necessary, a specific process is performed on the displayed object at the cursor position on the screen, or such control as displaying a new input screen corresponding to the cursor position is effected. Furthermore, in response to a click action, such control as executing a specific process previously associated with the displayed object (or character string) at the cursor position may be effected.

In this way, the operator, using the mouse, moves the cursor appearing on the screen 22 and executes a click action, thereby performing the system control sequentially.

Hereinafter, using several examples of the screen, concrete input operations with the mouse of the invention will be explained briefly.

Figure 4A:
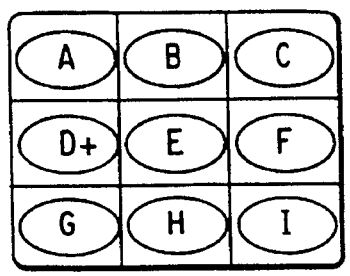
FIG. 4A is an explanatory diagram of the screen of the computer in FIG. 3 and pointing operations.
Figure 4B:
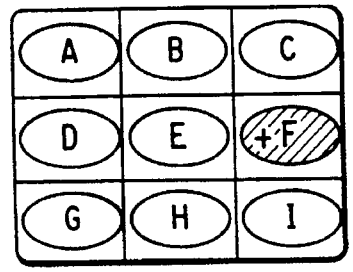
FIG. 4B is an explanatory diagram of the screen of the computer in FIG. 3 and pointing operations.

FIGS. 4A and 4B show an example of selecting icon F from nine icons A to I. It is assumed that + mark is in position D on the screen as shown in FIG. 4A. If the operator moves the mouse to the right, the cursor will also move to the right accordingly. As shown in FIG. 4B, when the cursor has moved over the F, the operator presses the click button 4 of the mouse to tell the laptop computer 21 that icon F has been selected. Once icon F is selected, the laptop computer 21 executes a process corresponding to icon F.

Figure 5A:
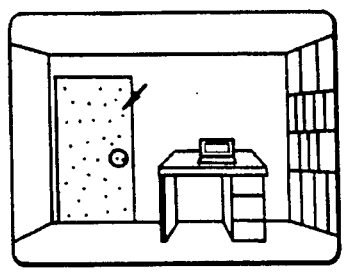
FIG. 5A is another explanatory diagram of the screen of the computer in FIG. 3 and pointing operations.
Figure 5B:
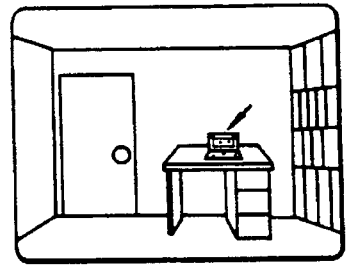
FIG. 5B is an explanatory diagram of the screen of the computer in FIG. 3 and pointing operations.

FIGS. 5A and 5B shows the image of the inside of a room. Explained here will be an example of selecting one object from the image. On the screen, the portion indicated by the arrow icon is brought into a mesh pattern. For instance, when the arrow icon is at the door before operation as shown in FIG. 5A, only the door has a mesh pattern. When the operator moves the mouse to the right and positions it over the word processor on the desk, only the word processor is brought into a mesh pattern as shown in FIG. 5B. This mesh representation enables the operator to recognize at a glance that the word processor is specified, when the operator wants to select the word processor, he has only to press the click button 4 while the word processor has a mesh pattern.

Figure 6A:
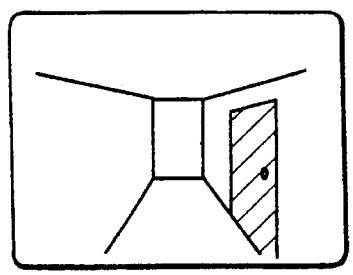
FIG. 6A is still another explanatory diagram of the screen of the computer in FIG. 3 and pointing operations.
Figure 6B:
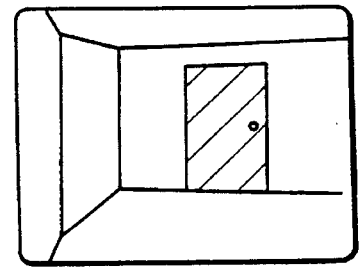
FIG. 6B is still another explanatory diagram of the screen of the computer in FIG. 3 and pointing operations.

FIGS. 6A and 6B show images of a corridor in a building. Explained here will be an example of turning the image toward the direction desired by the operator and displaying it. For instance, before operation, an image viewed in parallel with the corridor is displayed as shown in FIG. 6A. When the operator moves the mouse held in his hand to the right, the displayed image gradually changes to an image taken from the viewpoint of looking at to the right according to the mouse movement. Finally, it changes to an image of the right door viewed from the front as shown in FIG. 6B.

A more detailed configuration of the spatial control mouse of the invention will be explained.

Figure 7A:
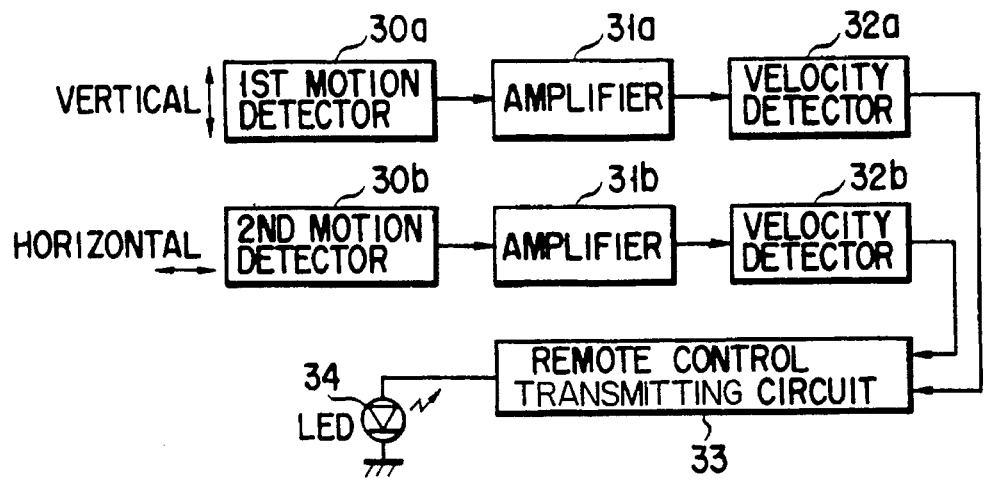
FIG. 7A is a more detailed block diagram of the spatial control mouse according to the first embodiment of the present invention.
Figure 7B:
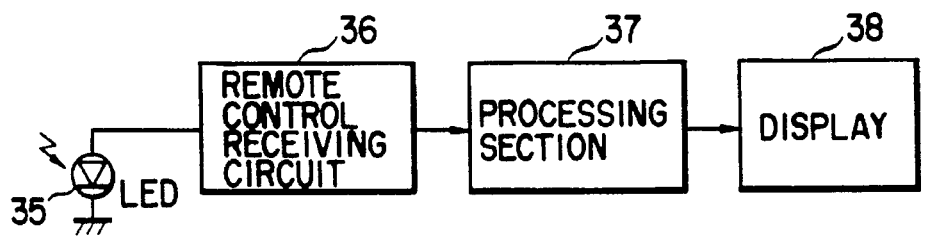
FIG. 7B is a block diagram of a control target device according to the first embodiment.

FIG. 7A is a more detailed block diagram of the mouse of the embodiment. FIG. 7B is a schematic block diagram of an example of the control target device.

The mouse comprises: a first motion detector 30a for sensing vertical acceleration, an amplifier 31a for amplifying the output of the first motion detector, a velocity detector 32a for integrating the output of the amplifier to obtain the velocity, a second motion detector 30b for sensing horizontal acceleration, an amplifier 31b for amplifying the output of the second motion detector, a velocity detector 32b for integrating the output of the amplifier to obtain the velocity, an remote control transmitting circuit 33 for transmitting the outputs of the velocity detectors 32a, 32b, and an infrared light-emitting element 34 driven by the transmitting circuit 33.

Piezoelectric elements are used for the first and second motion detectors 30a and 30b. The switch section containing the click button as shown in FIG. 2 is omitted in the figure.

The control target device, such as a computer, comprises an infrared light-receiving element 35 for receiving an optical signal radiated from the infrared light-emitting element 34, a remote control receiving circuit 36 for converting the received signal into specific form and outputting the converted signal, a processing section 37 for executing specific processes including screen control, and a display 38.

With this configuration, the operator holds the mouse in his hand, and moves the mouse in two-dimensional directions, such as up and down or from side and side, in an imaginary plane in an arbitrary space. The movement of the mouse is sensed by the first and second motion detectors 30a and 30b in such a manner that the movement is divided into, for example, acceleration in two directions, horizontal and vertical. The sensors then produce voltage signals in proportion to the horizontal and vertical accelerations.

The voltage signals corresponding to the sensed accelerations in two directions are relatively small signals. Thus, these two voltage signals are amplified by the amplifiers 31a, 31b. At this time, if necessary, a noise eliminating process is performed.

Figure 8A:
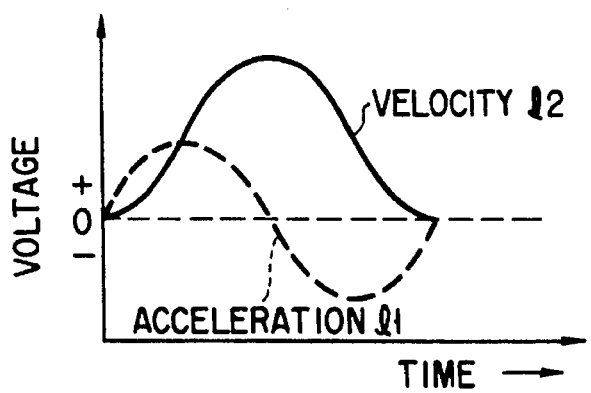
FIG. 8A is a voltage waveform diagram corresponding to the acceleration and velocity.

Next, the two amplified signals are each supplied to the velocity detectors 32a, 32b, which convert the voltage signals corresponding to the accelerations with two directions into voltage signals corresponding to moving velocities in two directions by integration. FIG. 8A shows the relationship between the voltage signal corresponding to the sensed acceleration of the mouse and the voltage signal converted into the velocity. The broken line 11 indicates the output voltage of the acceleration sensor 30a or 30b. The solid line 12 indicates the output voltage converted into the velocity by an integration circuit contained in the velocity detector 32a or 32b.

Figure 8B:
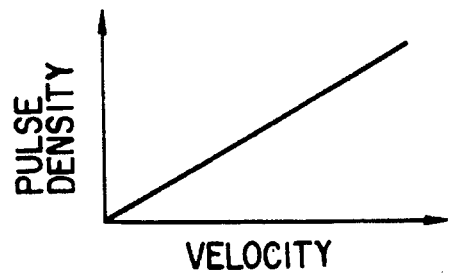
FIG. 8B shows the relationship between the velocity and the pulse density.

The output voltage 12 converted into the velocity may be outputted directly from the velocity detectors 32a, 32b. Instead, as shown in FIG. 8B, the output voltage may be converted into a pulse signal with the pulse density corresponding to the velocity, and then outputted.

The movement computing section that senses the velocity from the acceleration may be realized by using a digital integration circuit or the arithmetic operation of a microprocessor, in addition to the integration circuit.

Receiving the outputs of the velocity sensing circuits 32*a*, 32*b* and the signal indicating the click action from the switch section, the remote control transmitting circuit 33 performs the necessary processes on these signals, such as some of format conversion, coding, signal multiplexing, modulation, etc. Thereafter, the transmitting circuit drives the infrared light-emitting element 34 to transmit the processed signal to the control target device.

The signal corresponding to the moving velocity of the mouse and the signal indicating the click action transmitted from the mouse of FIG. 7A are received by the infrared light-receiving element 35 of the control target device of FIG. 7B. The remote control receiving circuit 36 performs the process of restoring the received signals to specific control signals.

The processing section 37, receiving those control signals, can obtain signals indicating the amount of movement of the mouse, the moving velocity, the moving direction, and the click action by computing the amount of movement of the mouse through specific arithmetic processes. The processing section 37, on the basis of these signals, controls the movement of the cursor on the screen 38. Depending on the situation, a specific process (e.g., a coloring or a patterning process) is performed on the displayed object at the cursor position after the movement. In addition, such control as displaying a new input screen corresponding to the cursor position (e.g., an input screen at a level of hierarchy immediately below that of the current input screen) may be effected. Furthermore, a process corresponding to the displayed object (or character string) at the cursor position may be performed in response to the click action. For instance, the process may be performed on the displayed object itself. Additionally, such control as executing a command (including control other than screen control) indicated by the character string may be effected.

The velocity detector 32*a*, 32*b* may be provided on the control target device side of FIG. 7B instead of on the mouse of FIG. 7A. The amount of movement of the mouse may be computed on the mouse side of FIG. 7A, and the computed amount may be given to the control target device side of FIG. 7B.

Explained next will be an example of using a piezoelectric vibration gyroscope as a movement sensing element.

FIG. 9A shows an example of the arrangement of a piezoelectric vibration gyroscope. The piezoelectric vibration gyroscope uses an equilateral triangular prism identity elastic metal 91 as a vibrator. On the respective sides of the identity elastic metal 91, longitudinal-mode piezoelectric ceramics 92 to 94 are provided. As shown in FIG. 9B, an exciting power supply 96 is used to cause the exciting piezoelectric ceramic 92 to excite the vibrator 91. In this case, at a standstill, the sensing piezoelectric ceramics 93, 94 produce an equal voltage. When the piezoelectric vibration gyroscope rotates on the axis of rotation 95, Corioli's force is generated in proportion to the angular velocity at an angle of 90 degrees viewed from the vibrating direction. As a result, the voltage generated at the sensing piezoelectric ceramic 93 differs from the voltage generated at the sensing piezoelectric ceramic 94. Thus, by computing the difference between the output voltages of the sensing piezoelectric ceramics 93, 94 using a subtracter unit 97, the angular velocity can be obtained. If the characteristics of the two sensing piezoelectric ceramics 93, 94 are the same, only the voltage signal proportional to the angular velocity will appear at an output terminal 98.

Application of the piezoelectric vibration gyroscope to the spatial control mouse of the present invention enables the sensing of not only parallel movements but also rotations on the axis. This widens the application range in terms of the operability of the mouse.

Even if the vibrator 91 does not rotate, when the mouse body moves in the direction at an angle of 90 degrees viewed from the vibrating direction of the exciting piezoelectric ceramic, the sensing piezoelectric ceramics 93, 94 generate a voltage difference in proportion to the moving velocity. By making use of this, the velocity of the mouse body can be sensed.

FIG. 10 shows an example of the arrangement of the spatial control mouse provided with a hand movement correction circuit for stabilizing pointing actions. The arrangement of this mouse is basically the same as that of the mouse of FIG. 7A, except that bandpass filters 39*a*, 39*b* are provided behind the amplifiers 31*a*, 31*b*.

Specifically, since the operator operates the mouse, holding it in his hand, it cannot be helped that the mouse body vibrates subtly. As a result, pointing actions sometimes cannot be effected correctly. To overcome this problem, the bandpass filters 39*a*, 39*b* are used to eliminate the vibration components due to hand movements.

Generally, the frequencies of hand movements are considered to be in the frequency range of 0.5 Hz to 15 Hz. Thus, setting the frequency eliminating range of the bandpass filters 39*a*, 39*b* in the above range is effective. This makes it possible to sense only the mouse movements intended by the operator, thereby preventing him from inputting erroneous data unintentionally. Consequently, it is possible to improve the reliability of the mouse.

The bandpass filters 39*a*, 39*b* may be made up of band limit filters, integration circuits, or arithmetic circuits. They may be realized by software processing.

Depending on the applications, the frequency range to be eliminated by the bandpass filter 39*a* may differ from that by the bandpass filter 39*b*.

There may be a case where the operator wants to move the mouse at a slow rate in the frequency range of nearly 0.5 Hz to 15 Hz, which are the frequencies of hand movements. In this case, the mouse only needs to be provided with two routes: one route with the bandpass filters 39*a*, 39*b*, and the other route without them. Even if the action lies in the range of frequencies to be eliminated, the signal may be outputted by switching the routes between cases where the action is and is not what the operator wants, taking into account the moving distance etc. obtained from the route without the bandpass filters 39*a*, 39*b*.

As described above, it is possible to provide a spatial control mouse which not only allows pointer operation in an arbitrary space, but also enables pointer operation and control operation easily even if the operator is away from the computer, the multimedia device, or their display unit.

FIG. 11 schematically shows the configuration of a spatial control mouse according to a second embodiment of the present invention. As in the first embodiment, two-dimensional movements of a spatial control mouse body 111 are sensed by a horizontal move sensing element 112 and a vertical move sensing element 113. The resulting movement signals are used to move the cursor on the screen of a control target device. The operation is effected by a cursor button 114 and a click button 117.

FIG. 12 is a conceptual use diagram of a spatial control image system where the spatial control mouse of the second embodiment is applied to a multimedia television. Instead of using many function keys to operate as with a conventional button-operated infrared remote-control device, the operator can operate while watching what is displayed on the input screen.

When the operator moves the mouse body 111 up and down and from side to side, the mouse senses the movements. Then, the control signals corresponding to the movements are generated within the mouse, and infrared light-emitting elements 115, 116 radiate the signals. The emitted infrared rays are received by an infrared light-receiving element 123 of a multimedia television body 121.

when the operator presses the cursor button 114 of the mouse with his first finger (e.g., the thumb), a cursor appears on the screen 122. Moving the mouse body 111, the operator moves the cursor to an object to be clicked. Then, he presses the click button 117 with his second finger (e.g., the index finger or the middle finger).

Figure 13A:
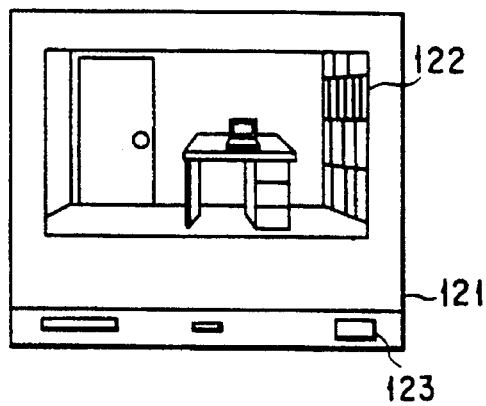
FIG. 13A is an explanatory diagram of the screen of the system in FIG. 12 and pointing operations.
Figure 13B:
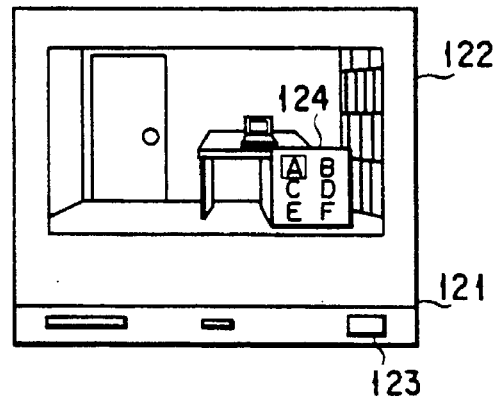
FIG. 13B is an explanatory diagram of the screen of the system in FIG. 12 and pointing operations.
Figure 13C:
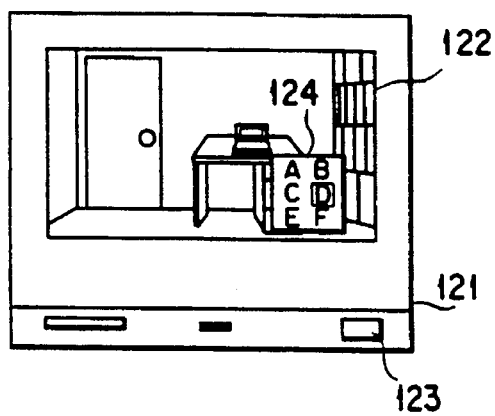
FIG. 13C is an explanatory diagram of the screen of the system in FIG. 12 and pointing operations.
Figure 13D:
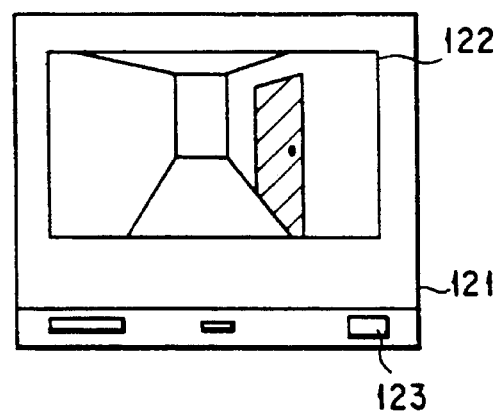
FIG. 13D is an explanatory diagram of the screen of the system in FIG. 12 and pointing operations.

Using the screen examples of FIGS. 13A to 13D, an example of operating the spatial control image system will be described. It is assumed that the contents of channel A are displayed on the screen. The state in such a screen is shown in FIG. 13A. For instance, when the operator wants to see channel D on the screen, he first clicks the cursor button 114. Then, an input screen 124 appears as shown in FIG. 13B. At this time, characters A to F indicating channels appear on the input screen 124. The current channel A is enclosed by a square cursor. The operator moves the mouse to move the cursor to character D as shown in FIG. 13C. Thereafter, he presses the click button 117 and then the cursor button 114. Then, the channel is changed as shown in FIG. 13D, and the input screen 124 disappears.

Such an operation can be applied to various actions such as volume control or hue adjustment, in addition to channel selection.

As described above, use of the spatial control mouse of the invention allows the operator to perform an input operation while watching the television screen differently from when a conventional button-operated infrared remote-control device with many function keys is used. Thus, the operator is freed from memorizing the functions of many buttons and troublesome button operations. Namely, the spatial control mouse provides a very easy operation environment for the operator to use.

Here, various types of click actions with the mouse of the first embodiment with a click button and that of the second embodiment with two buttons, a cursor button and a click button, will be described with reference to the table in FIG. 14. In FIG. 14, the act of pressing means the act of pressing and then releasing, not keeping pressing.

with a conventional mechanical or optical mouse, the switching on and off of cursor control is determined by whether the mouse body is in contact with the operation board. Thus, when the operator wants to move the cursor further with the mouse body at one edge of the operation board, he picks up the mouse once, sets it again in the working area of the operation board, and then moves it on the board again. With the spatial control mouse of the invention, however, the switching on and off of cursor control can be specified by the way the button is pressed or released or by operating an on/off specifying button.

With the spatial control mouse of the second embodiment, a cursor button (A) for effecting cursor control and a click button (B) for effecting an acknowledge operation or a select operation are provided separately.

In operation type 1, pressing cursor button (A) causes the cursor and the necessary input screen to appear to enable cursor control. After moving the displayed cursor, the operator presses the click button (B). By this operation, an acknowledge input or a select input is effected. Then, pressing the cursor button (A) again causes the cursor and the input screen to disappear, thereby disabling the cursor control.

In operation type 2, as long as the cursor button (A) is kept pressed, the cursor and the necessary input screen stay displayed, enabling cursor control. After moving the cursor, the operator presses the click button (B) for acknowledgement or selection. Then, releasing cursor button (A) again causes the cursor and the input screen to disappear, disabling the cursor control.

With the mouse of the first embodiment, the single click button acts as a cursor button for enabling cursor control and a click button for acknowledge and select operations.

In operation type 3, pressing the click button once causes the cursor and the necessary input screen to appear, enabling cursor control. After moving the cursor, the operator presses the click button preset times (e.g., twice) for acknowledgement or selection. Then, pressing the click button once again causes the cursor and the input screen to disappear, disabling the cursor control.

In operation type 4, as long as the click button is kept pressed, the cursor and the necessary input screen stay displayed, enabling cursor control. After moving the cursor, the operator releases the click button for acknowledgement or selection. This action also causes the cursor and the input screen to disappear, disabling the cursor control.

The operation types 3 and 4 can be used with the mouse of the second embodiment.

It is desirable to select the most suitable operation type for each application, taking into account the characteristics of the applications.

Another operation type is as follows. For example, cursor control is first enabled on the control target device side. If necessary, this is told to the operator. On the mouse side, the click button is operated for acknowledgement or selection.

Furthermore, the control target device side may control the timing of enabling and disabling cursor control and the timing of acknowledge or select operations, and the mouse side may be allowed to move only the cursor by being provided with no click button or by being provided with a click button but preventing its use.

A third embodiment of the present invention will be described.

A spatial control mouse of the present invention has an additional function which not only applies to control of the icons and images on the screen using a cursor, but also enables the operator to convey his intentions by holding the mouse body in his hand and drawing a specific operation pattern. Therefore, the term "spatial control mouse" is used to mean not only a mouse with the function of a pointing device, but also a mouse further having an operation pattern input function.

Natural movements based on man's ordinary senses generally take place in three-dimensional space. Therefore, if the operator's three-dimensional motion pattern can be recognized, it will be possible to provide such an environment as enables the operator to control a computer or video equipment sensuously. That is, a man-machine interface making use of sensuous movements/reflex movements such as physiological movements or habitual movements made unconsciously in everyday life can be said to be the most suitable human-oriented interface for sensuous control.

For physiological movements and habitual movements used in sensuous control, the following things can be considered. First, examples of physiological movements include movements due to emotions and movements determined by the structure of the human body. The following five movements are examples of physiological movements: (i) When surprised, our muscles contract for an instant, thus shrinking our body; (ii) when being nervous, our hands and legs tremble; (iii) When paying attention, we remain stationary; (iv) When attacking the opponent, we thrust out or bring down our fist; (v) When a left-handed person turns over sheets of paper, he turns over them from the lower left to the upper right.

The following four movements are examples of habitual movements: (i) when affirming, we nod our head; (ii) when raising the volume, we turn the volume control clockwise, while lowering the volume, we turn the volume control counterclockwise; ( iii ) When parting, we raise and wave our hand; (iv) When calling a person to come, we wave our hand toward us with the palm upward. As mentioned above, in our daily life, there are many examples of people making similar movements habitually.

Using physiological movements and habitual movements as input patterns is excellent in that the operator can make such movements unconsciously and sensuously.

In two-dimensional plane, however, it is difficult to express and recognize the movements. Namely, techniques for recognizing movements in three-dimensional space are indispensable. Thus, even if motion patterns are entered from a two-dimensional mouse operated over a conventional operation board, it is impossible to recognize our sensuous movements in three-dimensional space. With the present invention, however, because the spatial control mouse body 1 can be operated in three-dimensional space, it is possible to realize a sensuous control-type human-oriented interface, which is not feasible with a conventional two-dimensional mouse.

FIG. 15 is a block diagram of a spatial control mouse with a spatial motion pattern input function. The spatial control mouse comprises: a first motion detector 30a, an amplifier 31a, the aforementioned bandpass filter 39a, an A/D converter 40a, a velocity detector 32c, a second motion detector 30b, an amplifier 31b, the aforementioned bandpass filter 39b, an A/D converter 40b, a velocity detector 32d, a motion recognizing section 41, a motion pattern memory 42, an infrared remote-control transmitting circuit 43, and an infrared light-emitting element 34.

The basic configuration is almost the same as that of the mouse of FIG. 10 except that the motion recognizing section 41 for recognizing the motion patterns drawn by the operator and the motion pattern memory 42 are provided.

The function of a pointing device is realized by using almost the same arrangement as that of FIG. 10, specifically by using the first motion detector 30a, the amplifier 31a, the bandpass filter 39a, the A/D converter 40a, the velocity detector 32c, the second motion detector 30b, the amplifier 31b, the bandpass filter 39b, the A/D converter 40b, and the velocity detector 32d.

The velocity detectors 32c, 32d are supplied with A/D-converted signals. The operation of the velocity detectors 32c, 32d is the same as that of FIG. 7 except that they perform a digital process. For this reason, an explanation of the arrangement and operation of this portion will be omitted since they have been explained earlier in detail. The velocity detectors 32c, 32d may be designed to receive the signals before A/D conversion.

Explained next will be the process of recognizing motion patterns using the spatial control mouse and the way the control target device is controlled on the basis of the recognition result.

FIGS. 16A, 16B, and 16C show examples of input operations using such motion patterns. It is possible to perform on the control target device, such as a computer, the control operations entered according to various motion patterns: they include the act of making a circle with the mouse as FIG. 16A, the act of moving the mouse up and down as shown in FIG. 16B, and the act of moving the mouse from side to side as shown in FIG. 16C. For instance, when the control target device incorporates a speaker, it is possible to turn the mouse clockwise to raise the volume and to turn it counterclockwise to lower the volume. Furthermore, when the control target device requires the operator to enter data for acknowledgement, he can move the mouse up and down to convey "Yes" and move from side to side to convey "No." In this way, various control actions are possible.

The operator holds the mouse of the embodiment in his hand and moves his hand to draw a predetermined basic motion pattern in space. The movements of the mouse are divided once by the first and second motion detectors 30a, 30b into movements with two directions and then sensed. The signals in the respective directions are amplified by the amplifiers 31a, 31b. The bandpass filters 39a, 39b remove the unwanted components from the amplified signals. The resulting signals are converted by the A/D converters 40a, 40b into digital signals, which are supplied to the motion recognizing section 41.

The motion pattern memory 42 stores basic data items corresponding to a variety of specific basic motion patterns.

To form the operator's three-dimensional movements into patterns, the motion recognizing section 41 first converts the signals indicating movements with two directions into motion pattern data in the same format as that of the basic data. By comparing the motion pattern data with the basic data, the recognition of motion patterns is effected. Then, a motion code indicating the corresponding basic motion pattern is acquired.

The motion code is transmitted from the infrared remote-control transmitting circuit 43 and the infrared light-emitting element 34 to the control target device. Receiving the code, the control target device executes a control process according to the given motion code.

Here, there may be a case where even if an attempt is made to identify the operator's movement by comparing the motion pattern data obtained from the operator's movement with the basic data stored in the motion pattern memory 42, the movement cannot be identified because it is a hard-to-identify movement. To solve this problem, for example, the similarity between the motion pattern data and the basic data may be computed. A motion pattern with a basic data item whose similarity is the highest for the measured motion pattern data item is determined to be the operator's movement. Then, a motion code corresponding to the determined motion pattern is obtained. Additionally, well-known neuro-computer techniques or fuzzy-theory techniques may be used to identify motion patterns.

When more than one basic data item whose similarity is almost the same for the measured motion pattern data item is sensed, more than one pair of a motion code and a similarity may be transmitted to the control target device side, which may carry out a suitable operation on the basis of the given pairs of data items. Furthermore, the fact that the motion pattern cannot be identified may be reported to the control target device side, which may then display a message on the screen or produce a synthesized voice message to ask the operator to enter the motion pattern again.

Movements can be recognized in various ways. Complex movements in a character of 8 or in a mark of x can be recognized. Use and combination of various data items including moving velocity, acceleration, and pattern size enable even more types of control. For instance, when turning the mouse clockwise raises the volume, setting may be effected in such a manner that turning it clockwise so as to form a larger circle (or at a higher speed) raises the volume more than turning it clockwise so as to form a smaller circle (or at a lower speed) does.

It is effective to allocate processes corresponding to the meanings of the aforementioned man's ordinary habitual movements to the basic motion patterns, or to allocate to the basic patterns processes incongruous to the impression of the basic patterns. By doing this, the operator can not only memorize the functions given to the various basic patterns without any difficulty, but also use them very easily. Accordingly, use of the spatial control mouse of the invention provides an excellent man-machine interface environment.

For two directions in which movements should be sensed, the present embodiment deals with the vertical and horizontal directions. Instead, it is possible to sense other two directions: e.g., the direction (i.e., backward and forward directions) perpendicular to the previous directions and the vertical direction, or the backward and forward directions and the horizontal direction. Furthermore, by adding a motion detector to add an axis to be sensed, it is possible to use more complex movements in three-dimensional space as basic motion patters used in motion pattern input. Additionally, it is also effective to sense a rotation on an axis due to the twisting of the wrist and use the sense result as a motion pattern or a part of motion pattern.

The switching between the two functions of the mouse of the present embodiment, or the so-called pointer function and the motion pattern input function may be set on the mouse side or specified on the control target device side. The pointer function and the motion pattern input function may be combined for use.

Furthermore, the motion recognizing section 41 and the motion pattern memory 42 may be provided on the control target device side, and the mouse may output the data directly obtained from movement sensing.

In the current embodiment, the case where the operator operates a spatial control mouse, holding it in his hand has been explained. Instead of holding the mouse in the operator's hand for operation, it is possible to attach it to, for example, his leg or head, and sense the motion pattern of the mouse carrying portion. In addition, it is possible to incorporate the mouse in a device or tool operated by the operator, and sense the motion pattern of the device or tool.

As described above, according to the present invention, it is possible to provide a spatial control mouse which can not only allow pointer operations in an arbitrary space, but also recognize the operator's movements. It is also possible to provide a spatial control mouse which enables pointer operation and control operation easily even if the mouse is apart from a computer, a multimedia device, or their display unit.

Hereinafter, a fourth embodiment of the present invention will be explained.

Basically like the third embodiment, this embodiment is a system which allows the operator to enter spatial motion patterns using a three-dimensional input device such as a spatial control mouse to execute the desired function. In the current embodiment, the process of recognizing motion patterns in the third embodiment is made more detailed. Specifically, as will be described later, the embodiment is characterized in that the operator's motion patterns in space are converted into motion vector sequences, sets of small reference vectors, and the motion vector sequences are compared with the previously entered operator's basic motion patterns to make a recognition.

Use of the spatial motion pattern input system of the current embodiment basically enables the operator to draw a basic motion pattern in space to execute a function corresponding to the pattern. For example, the function shown in FIG. 17 can be realized. FIG. 17 shows an example of an input operation using a spatial motion pattern of the invention. As shown in the figure, the operator can move the spatial control mouse 1 from a to b and to c in a triangle to select a triangle item from the choices displayed on the screen 203 of a display unit 202.

The concept of motion vector used in the invention will be explained. FIG. 18A shows the magnitude (V) of movement of the spatial control mouse 1 moved by the operator and its direction ($\theta$). As shown in FIG. 18B, a movement made by the operator at time (t) is expressed by a combination of a multiple of the magnitude (n) of a reference vector and an angle to a reference direction (e.g., the horizontal direction). The movement expressed this way is defined as a motion vector (vt, $\theta$t). As shown in FIG. 18A, the motion vector is a vector obtained by referring to a table using as specified values the velocity (vx, vy) or acceleration ($\alpha$x, $\alpha$y) directly obtained from the sampling of the amount sensed by the mouse 1 at regular intervals. The magnitude of the motion vector is expressed by a multiple of the magnitude (n) of the reference vector. Thus, use of the motion vector enables the movement of the mouse to be obtained relatively as time-series small reference vector sets, even if the spatial coordinates of the mouse to a reference position (the origin) are not measured.

Figure 19:
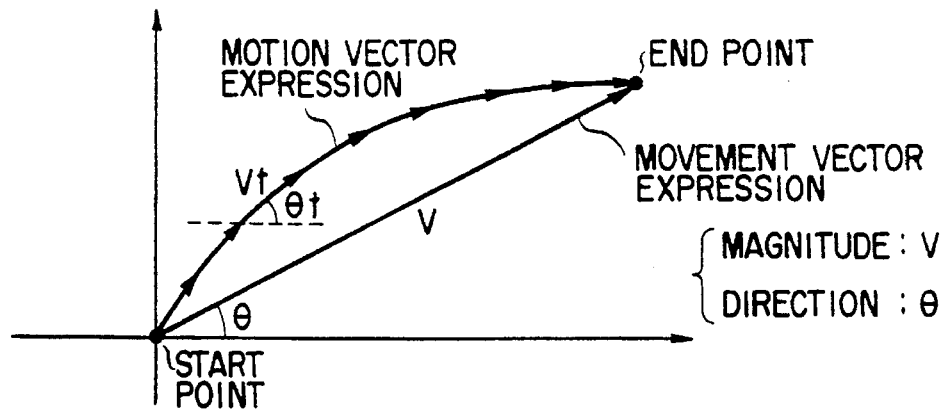
FIG. 19 is a diagram to help explain the difference between the movement vector and the motion vector.

Hereinafter, the difference between movement vectors generally used in expressing movements and motion vectors used in the invention will be explained. As shown in FIG. 19, in an expression using movement vectors, a movement is grasped only at the start and the end point, and the magnitude (V) and direction ($\theta$) of the movement between the start and the end point are used. On the other hand, in an expression using motion vectors in the invention, what is between the start and end points of a movement is considered to be a set of vector and its direction ($\theta$t) at a certain time (t) are used. By doing this, even if a movement is unstable in space, the movement can be grasped relatively by keeping track of changes in the magnitude of the motion vector and its direction at each time, thereby producing an arbitrary direcction motion vector sequence .

Figure 20:
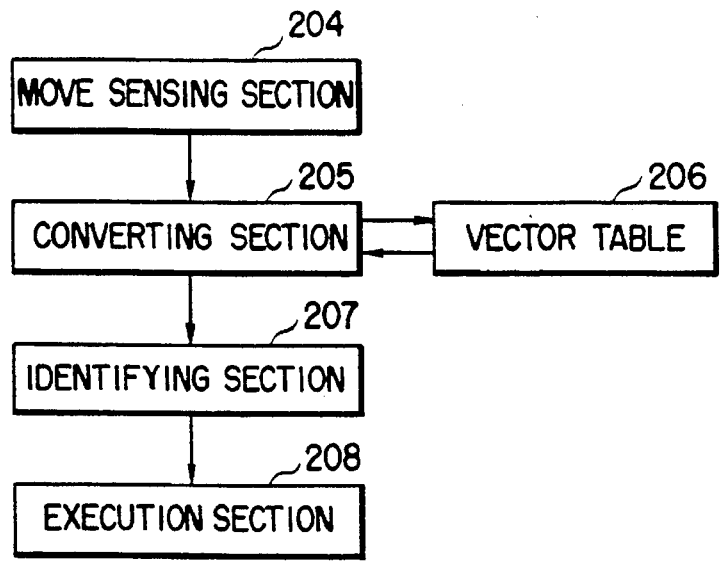
FIG. 20 is a block diagram of the important portion of a spatial motion pattern according to the fourth embodiment.

FIG. 20 is a block diagram of the important portion of a spatial motion pattern input system using a spatial control mouse of the present invention. The spatial motion pattern input system of the current embodiment comprises a movement sensing section 204, a converting section 205 for converting into motion vectors, a vector table 206 listing the correspondence between the sensed amounts and motion vectors, an identifying section 207, and an executing section 208.

Each component in FIG. 20 may be distributed suitably to the spatial control mouse and the control target device, if necessary, at least provided that the movement sensing section 204 is installed in the mouse and the executing section 208 is mounted on the control target device. For instance, the move sensing section 204 is mounted on the mouse, the converting section 205, the vector table 206, the identifying section 207, and the executing section 208 are installed in the control target device. Additionally, the move sensing section 204, the converting section 205, and the vector table 206 may be installed in the mouse, and the identifying section 207 and the executing section 208 be provided on the control target device. Other ways of mounting can be considered.

When the move sensing section 204 is installed in the mouse and the other components are provided in the control target device, the output signal of the move sensing section 204 is transmitted by an infrared remote-control transmitting circuit 33 as shown in FIG. 7A, and is received by an infrared remote-control receiving circuit 36 on the control target device side of FIG. 7A. In the case of using other mounting methods, the signal can be transmitted from the mouse side to the control target device side in a similar manner.

Specifically, the infrared remote-control transmitting circuit 33 or receiving circuit 18 performs processes (including format conversion, coding, multiplexing, and modulation) on the signal for which all the necessary processes for motion pattern input (described later) have finished or are still in progress. Then, the circuit drives the infrared light-emitting elements 12, 13 to transmit the resulting signal to the control target device. Receiving the signal, the control target device performs the processes of the subsequent steps if the motion pattern input processing of the signal has not finished yet, in order to execute a specific control operation according to the motion pattern input method.

The spatial control mouse explained in the embodiments in FIGS. 1, 2, and 15 can be used as the mouse in the current embodiment. For example, when the spatial control mouse explained in the third embodiment is used, the move sensing section 204 may be composed of the first motion detector 30a, the amplifier 31a, the bandpass filter 39a, the A/D converter 40a, the second motion detector 30b, the amplifier 31b, the bandpass filter 39b, and the A/D converter 40b. The converting section 205, the vector table 206, and the identifying section 207 correspond to the movement identifying section 41. The motion pattern memory 42 used in the movement identifying section 41 stores basic motion patterns described later. The executing section 208 corresponding to the processing section 37 of FIG. 7B, for example.

When the above-described spatial control mouse is used, the switch section 17 (not shown in FIG. 15) may be provided further with a cursor button for enabling cursor control and a motion pattern input button for enabling motion pattern input, in addition to a click button for acknowledgement or selection.

A three-dimensional computer input device which senses movements in space and enters the sense result to a computer has been disclosed in Jpn. Pat. Appln. KOKAI No. 3-192423. In this application, however, only the concept of sensing movements in space has been disclosed and can be applied only to limited pointing operations. With the present invention, however, the operator's movements in an arbitrary space are sensed by a spatial control mouse etc., and the sensed movements are inputted as meaningful movements in order to recognize movements in three-dimensional space. This is realized using the concept of the above-described motion vector.

Figure 21:
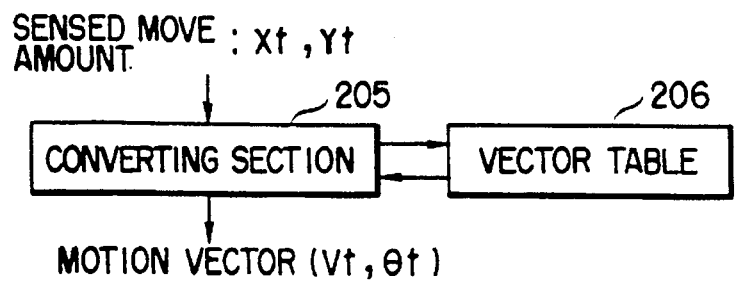
FIG. 21 is a diagram to help explain the function of a conversion section for converting the amount of spatial movement into a motion pattern.

FIG. 21 is a diagram to help explain the function of the converting section 305 for converting the amount of spatial movement obtained at the move sensing section 204 into a motion pattern.

The converting section 205 combines the amounts (Xt and Yt) in two directions, horizontal (from side to side) and vertical (up and down), sensed at the move sensing section 204 at a certain time (t), refers to the vector table 206, and converts the combined amount into a motion vector (Vt, θt) at high speed. Vt indicates the magnitude of the vector (a multiple of the reference vector) at a certain time (t) and θt represents the direction of the vector. In the explanation below, a series of movements in space is treated as a velocity vector sequence or an acceleration vector sequence. The whole set of time series of motion vectors as a result of moving the mouse is called a motion vector sequence (V { }, θ{ }). A motion vector sequence (V { }, θ{ }) is a time-series set of motion vectors, such as ((V1, θ1), (V2, θ2), . . . , (Vt, θt), . . . ).

Explained next will be an example of converting spatial movements into a motion vector using a vector table 206. The operator's movements are divided by the move sensing section 204 into, for example, movements in two directions, Xt and Yt, as shown in FIG. 22A, and then sensed. As shown in FIG. 22B, the sensed horizontal amount (e.g., Xt=2) and the sensed vertical amount (e.g., Yt=3) obtained at a move sensing step at a certain time (t) are converted into a motion vector ((vt, θt)=(V23, θ23)) using the vector table previously listing the correspondence between the sensed amounts and motion vectors. FIG. 22C shows a motion vector (V23, θ23). Coefficients using the magnitude of the reference vector as a reference are entered in the vector table used to obtain the magnitude of a motion vector.

Figure 23:
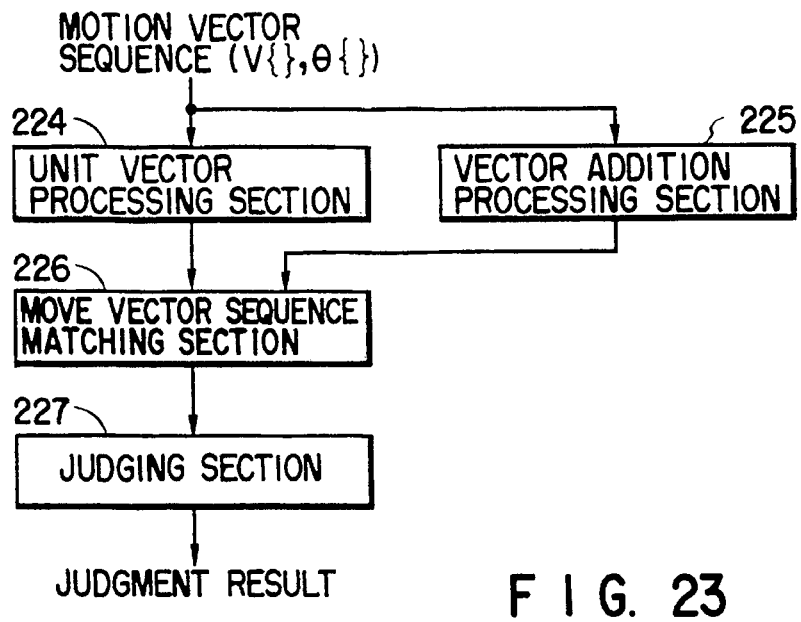
FIG. 23 is a schematic block diagram of the identification section.

FIG. 23 shows an internal arrangement of the identifying section 207 for comparing the motion vector sequence (V { }, θ{ }) obtained at the converting section 205 with a previously entered basic motion pattern to effect recognition. As shown in the figure, it is composed of a unit vector processing section 224, a vector addition processing section 225, a judging section 227. Either the unit vector processing section 224 or the vector addition processing section 225 may be eliminated.

The identifying section 207 first performs a process at the unit vector processing section 224 and/or a process at the vector addition processing section 225 using a motion vector (V { }, θ{ }). The result is compared with a previously entered basic pattern at a motion vector sequence matching section 226, and the judging section 227 judges whether or not a basic pattern corresponding to the motion vector sequence is present.

Figure 24:
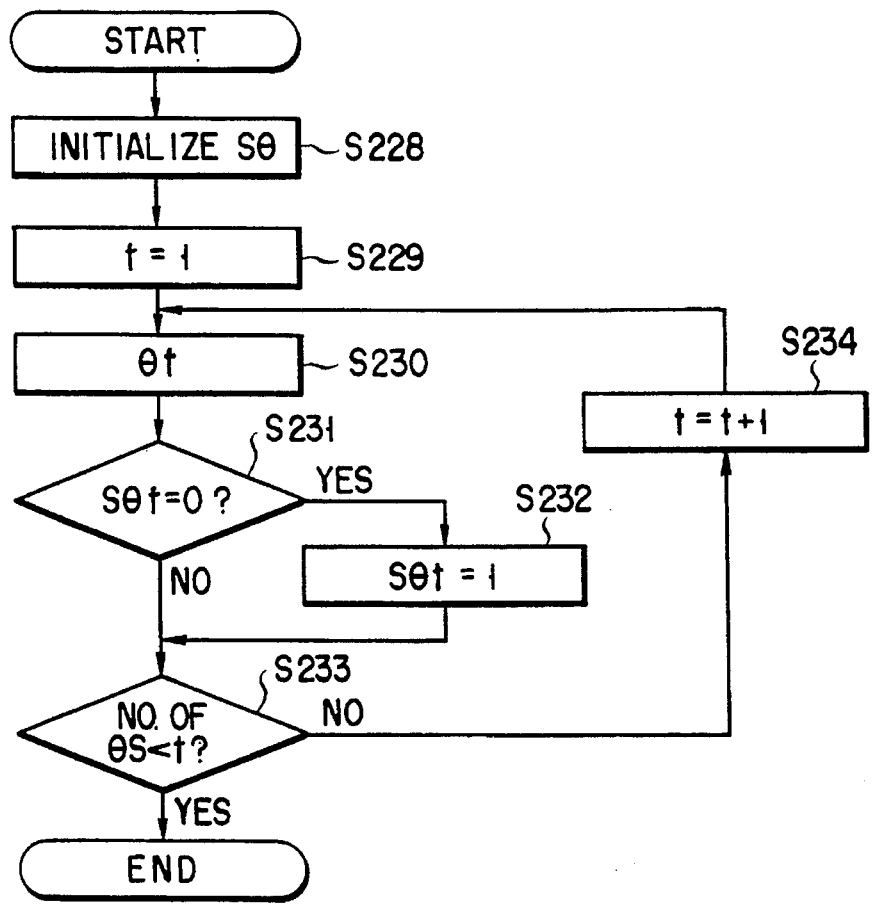
FIG. 24 is a flowchart of the processing at the unit vector processing section.

FIG. 24 is a flowchart of the processing at the unit vector processing section 224 of the identifying section 207. Here, a motion vector (Vt, θt) at a certain time (t) is treated as a unit vector in the direction (θ) of the vector, regardless of the magnitude of the vector, when unit vectors are gathered around the origin, this is called a unit vector function Sθ.

This unit vector function Sθ is initialized (step S228). To process the data in a motion vector sequence in time sequence, t is set at 1 (step S229). Vector direction θt at time t is read from the memory (step S230).

It is judged whether or not Sθ in that direction has existed in the previous motion vector sequences (step S231). If it has not existed, Sθt is set at 1 (step S232).

Then, it is judged whether or not the value of t is larger than the number of all samples in the motion vector sequence (step S233). If it is smaller, 1 is added to the value of t (step S234). Then, control goes back to the step of reading vector direction θt from the memory at time t.

From this point on, similar processes are repeated, and at step S233, when the value of t becomes larger than the number of all samples in the movement vector sequence, this processing will be terminated.

By the processing, the motion vectors due to the operator's movements are expressed as a set (a unit vector function) of unit vectors whose magnitude is 1.

A concrete example of processing unit vectors will be explained.

Figure 25A:
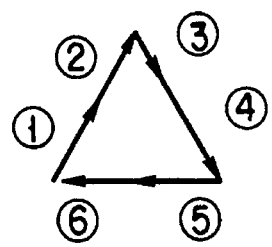
FIG. 25A is a drawing to help explain a unit vector process.
Figure 25B:
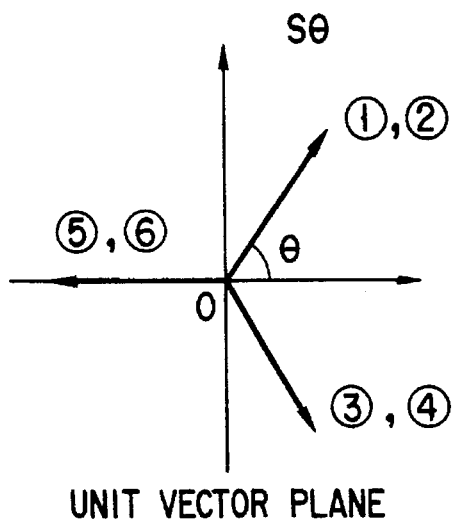
FIG. 25B is a drawing to help explain a unit vector process.

FIGS. 25A and 25B are explanatory diagrams of a unit vector process. For example, in a motion vector sequence (the number of samples: 6) for a triangle drawn in space as shown in FIG. 25A, the individual motion vectors differ in magnitude, but their directions are basically divided into three groups. The motion vectors are expressed as unit vectors in three directions. This enables triangles composed of vectors with almost the same directions to be identified as the same triangle, regardless of their size and slight deformation. Furthermore, when a circle is drawn in space, it can be identified since many unit vectors can be obtained. Still other various patterns can be identified.

In the unit vector process, the directions of unit vectors may be divided into several directions including the horizontal and the vertical directions. In addition, use of information on the order that unit vectors appeared makes it possible to deal with more motion patters, for example, to identify the direction of rotation (clockwise or counterclockwise) in which a circle was drawn.

A detailed example of the vector addition process will be explained.

Figure 26A:
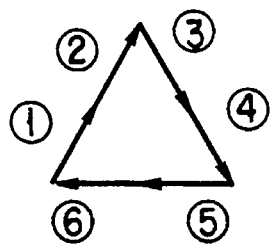
FIG. 26A shows a spatial motion pattern.
Figure 26B:
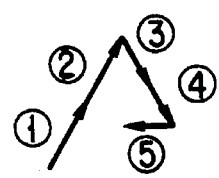
FIG. 26B shows another spatial motion pattern.
Figure 26C:
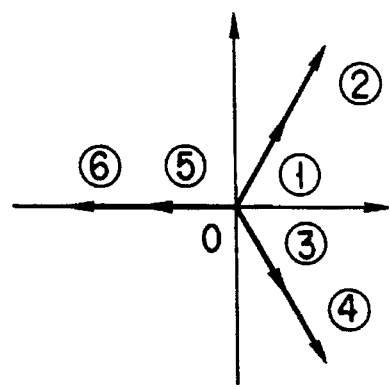
FIG. 26C is a drawing to help explain a vector addition process.
Figure 26D:
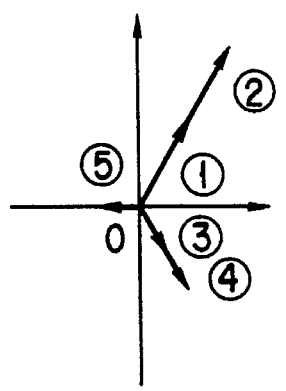
FIG. 26D is a drawing to help explain a vector addition process.

FIGS. 26A to 26D are drawings to help explain the vector addition process of adding the magnitude of movement vectors in each of their directions. For instance, as shown in FIGS. 26A and 26B, although the triangles drawn in space differ from each other in shape, the unit vector process produces the result as shown in FIG. 25B for both triangles. In this case, it is effective to add the magnitude of motion vectors for each of their directions with respect to the origin. The vector function obtained from the addition is called a cumulative vector function as against a unit vector function in the unit vector process. By comparing the process result with a previously entered basic motion pattern, it is possible to determine whether the spatial motion pattern is equal to or different from the basic motion pattern in terms of shape and size. For example, the vector addition process produces the result of FIG. 26C for the movement of FIG. 26A, and the result of FIG. 26D for the movement of FIG. 26B. Then, by comparing the result of FIG. 26C with that of FIG. 26D, it is possible to determine that the entered spatial motion patterns differ from each other, since the ratio of the magnitude of motion vectors forming the motion vector sequences differs from each other.

Since the magnitude of a motion vector is expressed as a multiple of the reference vector, the vector addition process is performed easily by adding the coefficients previously stored in a conversion table one after another. The vector addition process may be carried out roughly by dividing the directions of motion vectors into several groups including the horizontal and the vertical directions.

The motion vector sequence matching section 226 performs the process of matching the result from the unit vector processing section 224 or that from the vector addition processing section 225 with a previously entered basic motion pattern. Then, the judging section 227 judges whether or not a basic motion pattern corresponding to the motion vector sequence exists.

Then, on the basis of the judgment result, the identifying section 207 performs a recognizing process using similarity etc. On the basis of the result, the executing section 208 controls the target device using the basis data entered according to the motion pattern.

As described above, even if the spatial coordinates of the mouse with respect to the reference position (the origin) are not measured, motion patterns can be inputted by obtaining the movements of the mouse in the form of a set of time-series small reference vectors using motion vectors.

The difference between the motion vector sequence matching of the present invention and a conventional pattern matching will be explained.

Figures 27A, 27B:
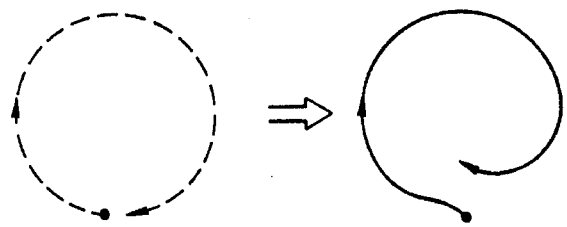
FIG. 27A is a drawing to help explain the difference between the motion vector sequence matching of the invention and the conventional pattern matching.
FIG. 27B is a drawing to help explain the difference between the motion vector sequence matching of the invention and the conventional pattern matching.
Figures 27C, 27D:
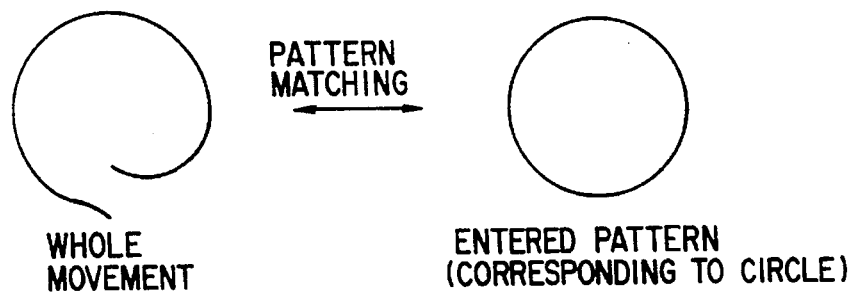
FIG. 27C is a drawing to help explain the difference between the motion vector sequence matching of the invention and the conventional pattern matching.
FIG. 27D is a drawing to help explain the difference between the motion vector sequence matching of the invention and the conventional pattern matching.
Figures 27E, 27F, 27G:
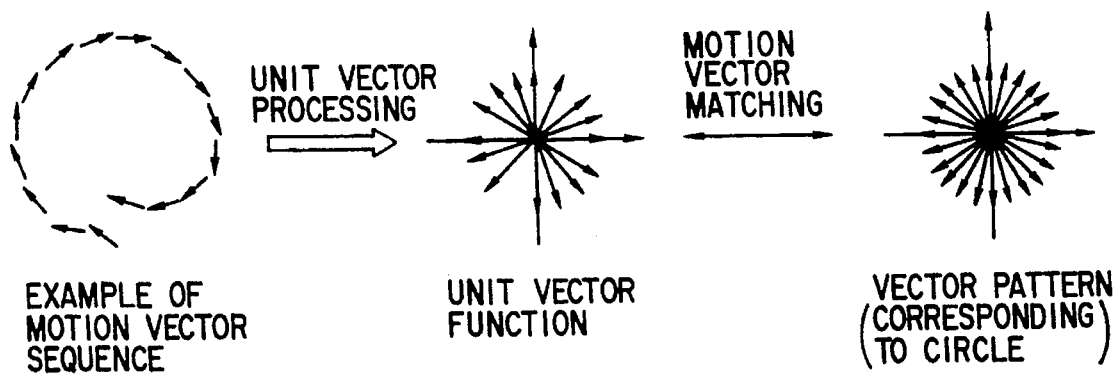
FIG. 27E is a drawing to help explain the difference between the motion vector sequence matching of the invention and the conventional pattern matching.
FIG. 27F is a drawing to help explain the difference between the motion vector sequence matching of the invention and the conventional pattern matching.
FIG. 27G is a drawing to help explain the difference between the motion vector sequence matching of the invention and the conventional pattern matching.

FIGS. 27A to 27G are drawings to help explain the difference between the motion vector sequence matching of the present invention and a conventional pattern matching. For example, when the operator wants to execute control corresponding to motion pattern "Circle," he should move the spatial control mouse 1 as shown in FIG. 27A. It is assumed that he has moved the mouse along the track shown in FIG. 27B as a result of a sloppy operation in space. At this time, because the conventional pattern matching process matches the track of the whole movement obtained as shown in FIG. 27C or a set of characteristic points with the shape of the previously entered basic pattern in FIG. 27D, the similarity between them is low because of such an unstable operation. Thus, with the conventional pattern matching process, the spatial motion patterns drawn by the operator sometimes cannot be recognized. With the motion vector sequence matching process of the present invention, however, since a motion vector sequence is produced on the basis of the movement of the mouse 1 by the operator as shown in 1g 27E, and the result of the unit vector process as shown in FIG. 27F, for example, is matched with the previously entered vector pattern as shown in FIG. 27B, the similarity between them can be made high even in the case of an unstable operation. Namely, use of the motion vector sequence matching enables even unstable operations in space to be recognized correctly.

The process of correcting a movement contrary to the operator's intentions will be explained.

FIGS. 28A to 28D are drawings to help explain a correction section for correcting the amount sensed at the move sensing section 204. The cursor moves in a different direction from his hand's movement in space unless the operator holds the mouse so that the horizontal and vertical directions of the mouse may correspond to the horizontal and vertical directions of the screen. For instance, when the operator holds the mouse upside down differently from the proper direction, his hand's movement differs from the cursor movement by 180 degrees. In this case, since the operator can see the cursor movement on the screen, he immediately finds out that the horizontal and vertical directions of the mouse do not coincide with those of the screen. He then holds the mouse properly and thereafter can operate it comfortably.

When the operator unconsciously twists his wrist (due to the function of our hands and arms) in the course of moving the mouse and consequently gives it a turn, the direction in which his hand move will differ from that of the cursor movement. Specifically, when his arm moves in the desired direction as the mouse 1 turns accidentally, the operator often does not notice the fact. As a result, he may have the impression that the input device is not easy to use. For instance, it is assumed that the operator wants to move the cursor 235 displayed on the screen 203 of FIG. 28A horizontally to the right from the coordinates (X0, Y0) to the coordinates (X1, Y1). In this case, when the operator has moved the mouse, while twisting his wrist, the mouse has then turned as shown in FIGS. 28B, 28C, and 8D in that order. As a result, the cursor 235 has moved in an unexpected direction as shown in FIG. 28A where it has moved from the coordinates (XA, YA) to the coordinates (XB, YB), and then to the coordinates (XC, YC).

To overcome this problem, as shown in FIG. 29, a rotation amount sensing element 236 is provided in the direction (i.e., backward and forward) perpendicular to both of the horizontal move sensing element 2 and the vertical move sensing element 3. According to the sensed rotation amount, the distribution of the components of the controlled amounts (such as horizontal or vertical velocity or acceleration) on the sense axis is corrected.

Figure 30:
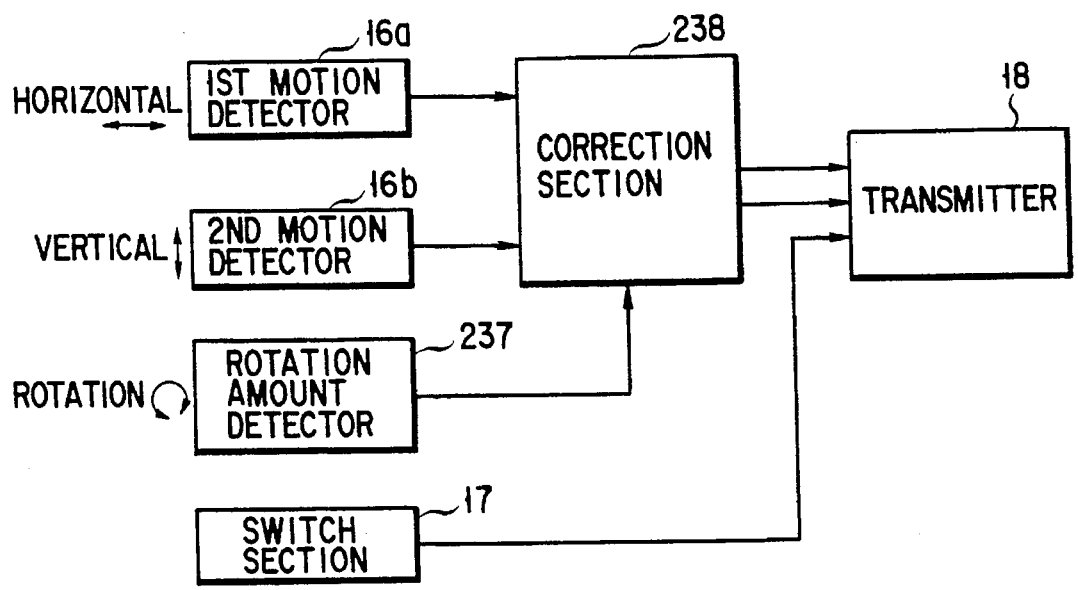
FIG. 30 is a schematic block diagram of a spatial control mouse with a correction section.

FIG. 30 is a schematic block diagram of a spatial control mouse further provided with the rotation amount detector 237 and a correction section 238. The movements of the mouse by the operator are converted by the motion detectors 16a, 16b into specific move signals (e.g., signals indicating the velocity or moving distance of the mouse). At this time, on the basis of the amount obtained at the rotation amount detector 237, the components of move amounts in two direction, horizontal (from side to side) and vertical (up and down) are corrected by the correction section 208.

By this correction, the pointing device performance of the mouse can be improved, and motion pattern input can be effected accurately.

Figure 31A:
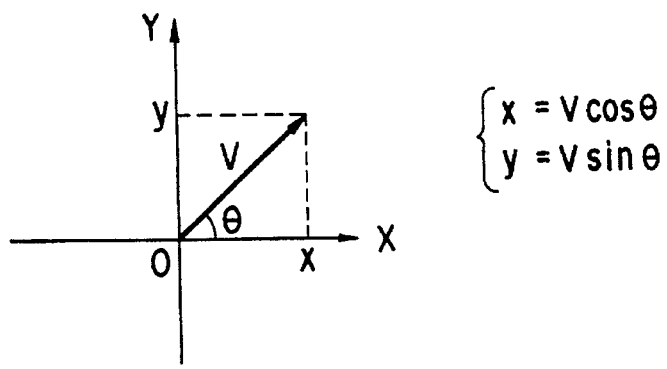
FIG. 31A is a diagram to help explain the processing at the correction section.
Figure 31B:
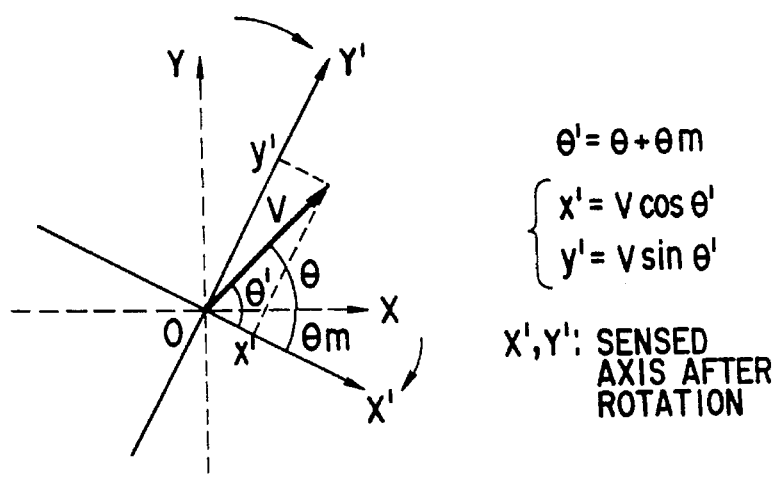
FIG. 31B is a diagram to help explain the processing at the correction section.

FIGS. 31A and 31B are diagrams to help explain the processing at the correction section 238. It is assumed that when the horizontal and vertical directions of the mouse are shifted from those of the screen due to a turn caused by the twisting of the operator's wrist, the amounts sensed by the motion detectors 16a, 16b are (x') in the horizontal direction and (y') in the vertical direction. It is also assumed that when they are not shifted from each other, the sensed amounts are (x) in the horizontal direction and (y) in the vertical direction. Similarly, it is assumed that when they are shifted from each other, the direction of the motion vector is (θ') and that when they are not shifted from each other, the direction of the motion vector is (θ). Furthermore, the amount sensed by the rotation amount detector section 237 is assumed to be (θm).

Here, the mouse is supposed to be moved in the direction (θ) as shown in FIG. 31A. In this case, when the mouse is shifted as much as (θm) due to a turn caused by the twisting of the operator's wrist, the direction of the motion vector will be determined to be (θ') as shown in FIG. 31B:

$$\theta' = \theta + \theta m$$

$$x' = V \cdot \cos\theta'$$

$$y' = V \cdot \sin\theta'$$

Therefore, using the magnitude (V) of the motion vector, the erroneously obtained motion vector direction (θ'), and the amount (θm) obtained from the rotation amount sensing detector 237, the component distribution of the move amount in the direction of the sense axis can be corrected.

Explained next will be the way that the function of a spatial motion pattern input system of the current embodiment is expanding from two-dimensional patterns to three-dimensional patterns.

Figure 32:
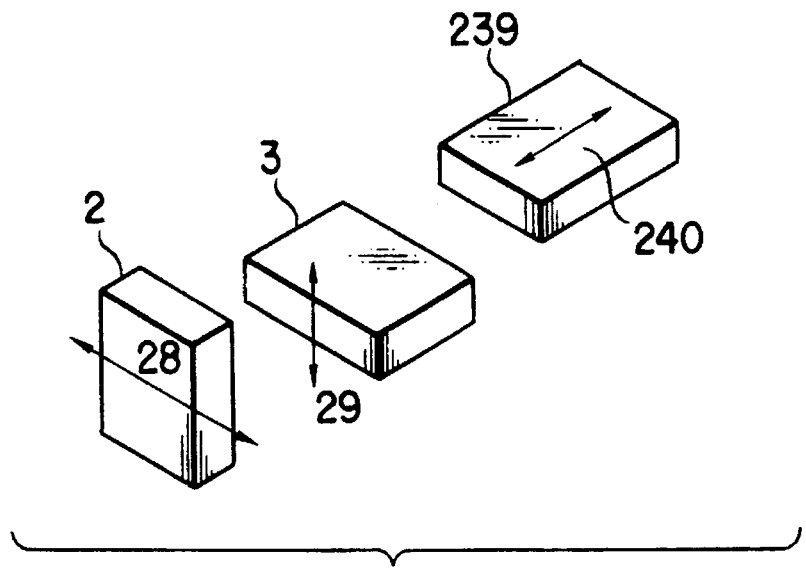
FIG. 32 schematically shows an example of the installation position of a back and forth direction sensing element for expanding into three-dimensional motion pattern input.

In the above embodiments, the way of sensing movements along two axes has been explained. The present invention is not limited to this. For instance, by providing a back-and-forth move sensing element 239 corresponding to the backward and forward direction viewed from the spatial control mouse as shown in FIG. 32, spatial motion patterns can be entered in three-dimensional movements.

Figure 33:
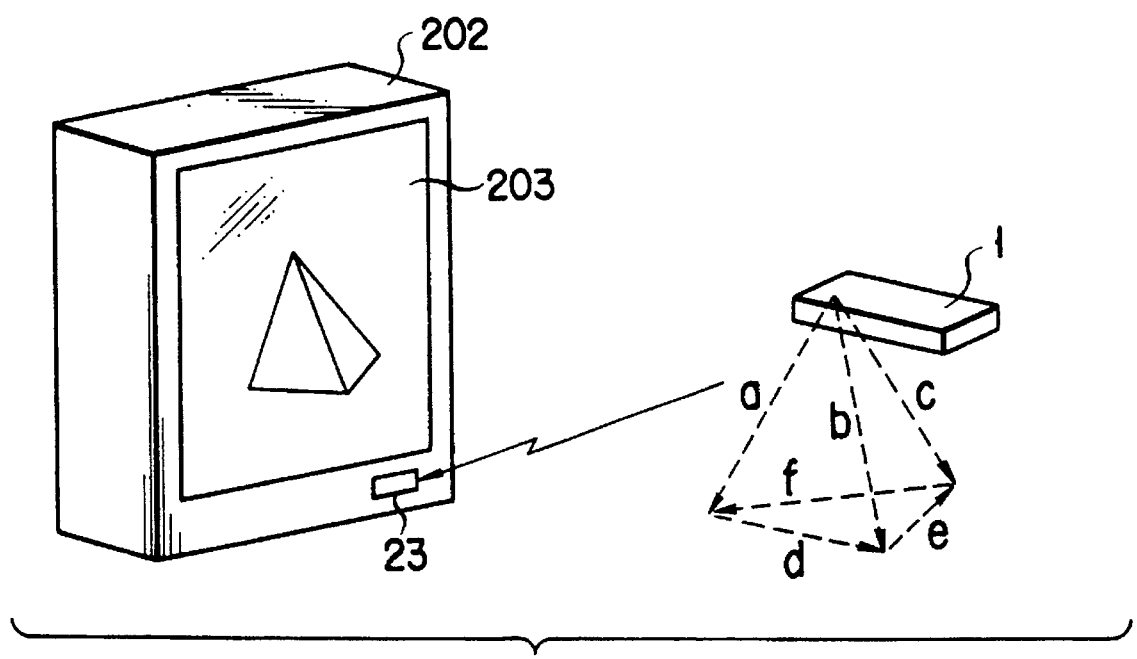
FIG. 33 shows a three-dimensional motion pattern input method.

FIG. 33 shows a method of inputting motion patterns in three-dimensional movements. The operator can draw a triangular pyramid on the screen 203 of a display unit 202 by moving the mouse 1 in a triangular pyramid, starting with a, and passing through b, c, c, e, and f in that order.

Figures 34A, 34B:
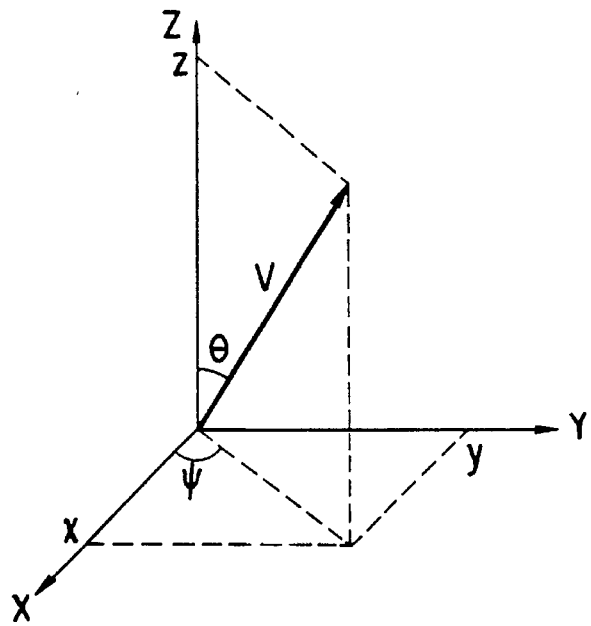
FIG. 34A shows a method of representing motion vectors in three-dimensional space.
FIG. 34B is a vector table referred to in converting movements in three-dimensional space into a motion vector.

A motion vector in three-dimensional space is expressed by the magnitude of vector (V) and its direction (θ, φ) as shown in FIG. 34A. FIG. 34B shows a vector table referred to when movements in three-dimensional space are converted into motion vectors.

By performing processes similar to the two-dimensional spatial motion pattern input already described using the vector table, input can be effected in three-dimensional spatial motion patterns.

ON/OFF control of the spatial motion pattern input mode will be explained.

The major operation on the control target device of an ordinary spatial control mouse would be to move the cursor on the screen according to the operator's hand movement. This operation is a form of what is called a pointer function. To change from the pointer function mode to the motion pattern input mode, the following operation is necessary. For example, (1) The cursor is placed in a certain position (the area where various tools can be selected, or the area where a menu is selected), (2) the motion pattern input start button is pressed, and (3) Predetermined simple movements (e.g., waving up and down several times) are made.

When control returns from this mode to the pointer function mode, a suitable operation or a predetermined rule is necessary. For example, (1) A rule is made that when a certain period of time has elapsed, control is forced to exit from the current mode, (2) It is judged whether or not it is in a stationary state (a state where no amount of movement is sensed), (3) the motion pattern input button is released (or pressed again).

Furthermore, since the operability after the execution of a control operation varies, depending on the handling of the cursor in the motion pattern input mode, the following actions can be considered according to the applications. (1) The cursor is erased from the screen, but its coordinates on the screen at the time of entering the motion pattern input mode are retained. By doing this, because when control exits from the current mode, the cursor appears again at the position where it was when control entered the motion pattern input mode, the operator can resume his work at that position after executing the job of, for instance, selecting a tool. (2) The cursor moves over the screen so as to correspond to the mouse movements as usual. This enables the operator to enter accurate movements because he can apply feedback to his action, while watching the cursor movements. (3) The cursor is changed into such a form as allows the operator to understand at a glance that control is in the motion pattern input mode. It is possible to combine some of these.

Figures 35A, 35B:
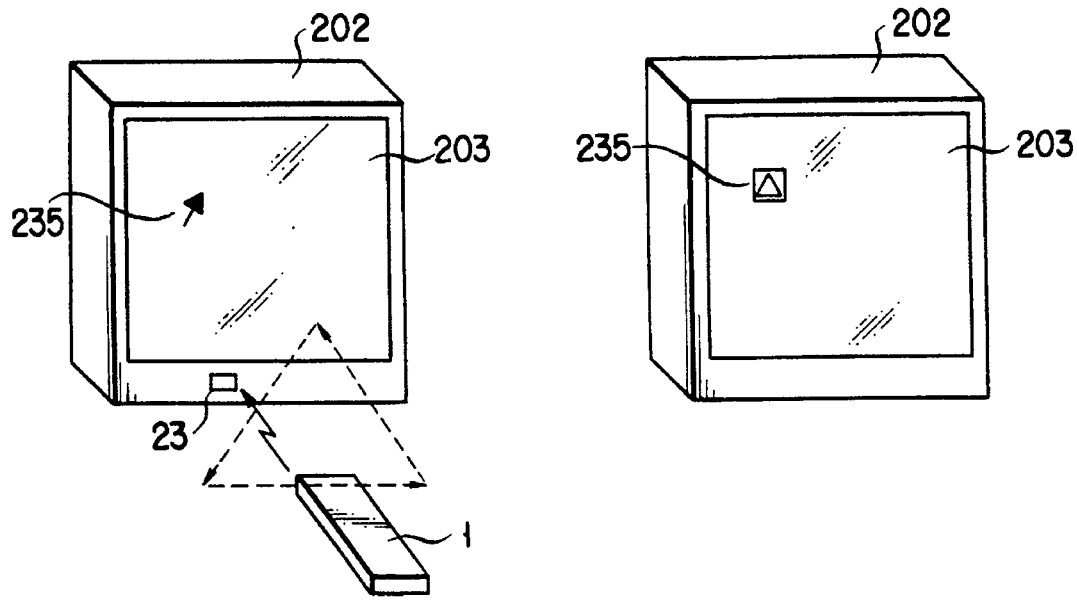
FIG. 35A shows an ordinary cursor before the input of a motion pattern.
FIG. 35B shows a modification of the cursor after recognition by motion pattern input.

Additionally, by changing the cursor 235 which takes an arrow shape (or a cross shape) in normal operation, shown in FIG. 35A into the shape shown in FIG. 35B, the operator can understand easily whether or not the motion pattern is effected correctly. In addition to this, by eliminating the screen display for acknowledging each motion pattern input (e.g., the movement just made is . . . , isn't it ?) and the operator's acknowledge operation (Yes and No), the operator can proceed to the next operation smoothly. FIGS. 35C to 35G show various examples of the shape of the cursor changed by acknowledgement.

Furthermore, operation in space is sometimes unstable. Thus, to move the cursor straight, the direction in which the cursor is desired to move may be recognized from the motion patterns to change the cursor into a shape pointing in that direction. Thereafter, the cursor has only to be controlled to move in that direction.

As described in detail, with the current embodiment, in the system using a three-dimensional input device (such as a spatial control mouse) enabling spatial pointer operations as well as pointer operations in an arbitrary plane, it is possible to realize a sensuous man-machine interface environment which can recognize the operator's motion patterns in space and control a computer or a multimedia device.

FIG. 36 is a schematic diagram of a spatial control mouse according to a fifth embodiment of the present invention. This mouse is basically the same as those in the above-described embodiments in terms of configuration and operation, except that a move sensing element 7 for sensing back and forth movements is further provided.

Specifically, the present invention is not limited to the sensing of movements along two axes. For instance, as in this embodiment, by providing motion detectors 2, 3, 7 corresponding to three axes, movements in three-dimensional space can be sensed.

Since ordinary screens are two dimensional, use of motion detectors 2, 3 for two axes as shown in the first embodiment is sufficient to locate the position of the cursor on the screen. However, now that more and more spatial control mouse devices capable of sensing movements along three axes in the embodiment are being used, they will be very effective pointing devices when used with systems with spurious three-dimensional representation.

Additionally, it is possible to allocate special roles to movements along a third axis. For example, it is possible to determine the ratio of the amount of movement of the mouse on a first and a second axis to that of the cursor on the screen on the basis of a (imaginary) position on the third axis.

To sense movements along the third axis, rotation on the axis may be sensed using the piezoelectric gyroscope of FIG. 9, instead of the motion detector 7 to sense parallel movements.

Furthermore, with the spatial control mouse of the third embodiment, movements in three-dimensional space may be used as basic motion patterns for pattern input.

For further expansion, a sensing section for a fourth axis or still other axes may, of course, be provided.

In this case, the role of a pointing device may be given to two axes, and the role of motion pattern input may be assigned to the other axes.

As described above, with the present invention, it is possible to provide a spatial control mouse which not only enables pointer movements in an arbitrary imaginary plane and even spatial pointer movements, but also recognizes the operator's movements and allows him to perform pointer operation or control operation easily even if he is away from the computer, the multimedia device, or their display unit.

FIG. 37 is a schematic diagram of a spatial control mouse according to a sixth embodiment of the present invention. The mouse is basically the same as that of the previous embodiment in configuration and operation. Moves in two-dimensional directions of the mouse body 1 are sensed by a horizontal move sensing element 2 and a vertical move sensing element 3, and click operation is accepted by a click button 4.

In this embodiment, the mouse and the control target device are connected to each other by a connecting cable 8. Connection is effected by inserting an end connector 9 of the connecting cable 8 of the mouse into the control target device. The output signal from the mouse travels over the connecting cable 8 and enters the control target device.

When a wireless spatial control mouse is not required for the system, use of the cable spatial control mouse makes it possible to transmit control signals very reliably without considering the directivity of transmission, unlike the infrared ray method.

Although using various embodiments, the present invention has been explained, the shape of the mouse is not necessarily be the conventional mouse-like shape. various shapes may be used, depending on the purposes and use.

Furthermore, the mouse is not necessarily held in the operator's hand. It may be installed or incorporated in another device or a tool which the operator uses directly.

Additionally, by providing the mouse with other input means such as speech input, a much wider variety of operating environment can be offered.

As many click buttons as needed may be provided. They may take various shapes.

In the above embodiments, it is desirable to integrate the circuits within the mouse into a single chip as much as possible.

The present invention is not restricted to the above-described embodiments, but may be practiced or embodied in still other ways without departing from the spirit or essential character thereof.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A spatial motion pattern input system for causing a control target device to perform control according to a spatial motion pattern of a spatial control input device, comprising:

move sensing means for sensing at least an amount of movement of the spatial control input device on two axes from the amount of movement of the device on three specific nonparallel axes in space, by means of an element built in the spatial control input device which operates in response to a change in velocity of the spatial control input device;

conversion means for converting said amount of movement of the spatial control input device on two axes into a first arbitrary direction motion vector sequence;

identification means for performing identification by comparing a second arbitrary direction motion vector sequence, corresponding to a basic motion pattern which was previously entered, with said first arbitrary direction motion vector sequence; and execution means for controlling said control target device based on a recognition result from said identification means.

2. The spatial motion pattern input system according to claim 1, wherein said identification means contains:

unit vector processing means for generating a first unit vector function an the basis of the first motion vector sequence obtained from the amount of movement of the spatial control input device;

addition vector processing means for generating a first cumulative vector function on the basis of the first motion vector sequence obtained from the amount of movement of the spatial control input device; and identification means for comparing the first generated unit vector function with a second unit vector function obtained from the second motion vector sequence corresponding to the basic motion pattern, and also comparing the first generated cumulative vector function with a cumulative vector function obtained from the second motion vector sequence corresponding to the basic motion pattern, and then on the basis of these comparison results, identifying the spatial motion pattern of the spatial control input device.

3. The spatial motion pattern input system according to claim 1, wherein said identification means contains:

unit vector processing means for generating a first unit vector function on the basis of the first motion vector sequence obtained from the amount of movement of the spatial control input device; and identification means for comparing the first generated unit vector function with a second unit vector function obtained from the second motion vector sequence corresponding to the basic motion pattern, and then on the basis of the comparison result, identifying the spatial motion pattern of the spatial control input device.

4. The spatial motion pattern input system according to claim 1, wherein said identification means contains:

addition vector processing means for generating a first cumulative vector function on the basis of the first motion vector sequence obtained from the amount of movement of the spatial control input device; and identification means for comparing the first generated cumulative vector function with a second cumulative vector function obtained from the second motion vector sequence corresponding to the basic motion pattern, and then on the basis of the comparison result, identifying the spatial motion pattern of the spatial control input device.

5. The spatial motion pattern input system according to claim 1, wherein said conversion means contains a conversion table in which the number of unit vectors and angles are entered for the amount of spatial movements, and obtains the result of converting said amount of spatial movements into the first motion vector sequence by giving the values obtained by sampling in time said amount of spatial movement composed of at least two amounts sensed at said move sensing means, to the conversion table one after another as specified values.

6. The spatial motion pattern input system according to claim 1, wherein:

said move sensing means further contains rotation amount sensing means for sensing the amount of rotation on an axis perpendicular to each pair of two axes on which the amount of movements of said spatial control input device is sensed; and said conversion means further contains correction means for extracting the amount of movement obtained by subtracting said amount of rotation on the axis from the relevant amount of movements on two axes of said spatial control input device sensed at said move sensing means, on the basis of the sense result at the rotation amount sensing means.

7. The spatial motion pattern input system according to claim 1, wherein:

said control target device contains the display screen; and said execution means displays the shape of the spatial motion pattern recognized by said identification means.

8. The spatial motion pattern input system according to claim 1, wherein:

said move sensing means is installed in the spatial control input device;

said conversion means, said identification means, and said execution means are installed in the control target device;

the spatial control input device is provided with transmission means for transmitting the output signal of said move sensing means; and said control target device is provided with reception means for receiving the signal transmitted from said transmission means and transferring it to said conversion means.

9. The spatial motion pattern input system according to claim 1, wherein:

said move sensing means, said conversion means, and said identification means are installed in the spatial control input device;

said execution means is installed in the control target device;

the spatial control input device is provided with transmission means for transmitting the output signal of said identification means; and said control target device is provided with reception means for receiving the signal transmitted from said transmission means and transferring it to said execution means.

10. A spatial control input device for sensing spatial motion patterns to cause a control target device to perform control according to a spatial motion pattern drawn by an operator, comprising:

move sensing means for sensing at least an amount of movements of the spatial control input device on two axes from an amount of movements of the spatial control input device on three specific nonparallel axes in space, by means of an element built in the spatial control input device which operates in response to a change in velocity of the spatial control input device;

conversion means for converting said amount of spatial movement of the spatial control input device on two axes into a first arbitrary direction motion vector sequence;

identification means for performing identification by comparing a second arbitrary direction motion vector sequence, corresponding to a basic motion pattern which was previously entered, with said first arbitrary direction motion vector sequence; and transmission means for transmitting a recognition result from said identification means to the control target device.

11. The spatial motion pattern input system according to claim 10, wherein said identification means contains:

unit vector processing means for generating a first unit vector function on the basis of the first motion vector sequence obtained from the amount of movement of the spatial control input device;

addition vector processing means for generating a first cumulative vector function on the basis of the first motion vector sequence obtained from the amount of movement of the spatial control input device; and identification means for comparing the first generated unit vector function with a second unit vector function obtained from a motion vector sequence corresponding to the basic motion pattern, and also comparing the first generated cumulative vector function with a second cumulative vector function obtained from the second motion vector sequence corresponding to the basic motion pattern, and then on the basis of these comparison results, identifying the spatial motion pattern of the spatial control input device.

12. The spatial motion pattern input system according to claim 10, wherein said identification means contains:

unit vector processing means for generating a first unit vector function on the basis of the first motion vector sequence obtained from the amount of movement of the spatial control input device; and identification means for comparing the first generated unit vector function with a second unit vector function obtained from the second motion vector sequence corresponding to the basic motion pattern, and then on the basis of the comparison result, identifying the spatial motion pattern of the spatial control input device.

13. The spatial motion pattern input system according to claim 10, wherein said identification means contains:

addition vector processing means for generating a first cumulative vector function on the basis of the first motion vector sequence obtained from the amount of movement of the spatial control input device; and identification means for comparing the first generated cumulative vector function with a second cumulative vector function obtained from the second motion vector sequence corresponding to the basic motion pattern, and then on the basis of the comparison result, identifying the spatial motion pattern of the spatial control input device.

14. The spatial motion pattern input system according to claim 10, wherein said conversion means contains a conversion table in which the number of unit vectors and angles are entered for the amount of spatial movements, and obtains the result of converting said amount of spatial movements into the first motion vector sequence by giving the values obtained by sampling in time said amount of spatial movement composed of at least two amounts sensed at said move sensing means, to the conversion table one after another as specified values.

15. The spatial motion pattern input system according to claim 10, wherein:

said move sensing means further contains rotation amount sensing means for sensing the amount of rotation on an axis perpendicular to each pair of two axes on which the amount of movements of said spatial control input device is sensed; and said conversion means further contains correction means for extracting the amount of movement obtained by subtracting said amount of rotation on the axis from the relevant amount of movements on two axes of said spatial control input device sensed at said move sensing means, on the basis of the sense result at the rotation amount sensing means.

16. A spatial motion pattern input method for causing a control target device to perform control according to spatial motion patterns of a spatial control input device, the method comprising the steps of:

sensing at least an amount of movement of the spatial control input device on two axes from an amount of movement of the spatial control input device on three specific nonparallel axes in space, by means of an element built in the spatial control input device which operates in response to a change in velocity of the spatial control input device;

converting said amount of movement of the spatial control input device on two axes, sensed at said move sensing means, into a first arbitrary direction motion vector sequence;

comparing a second arbitrary direction motion vector sequence, corresponding to a basic motion pattern previously entered, with said first arbitrary direction motion vector sequence; and controlling said control target device based on a result of said comparing step.

17. The spatial motion pattern input method according to claim 16, wherein said comparing step comprises:

generating at least one of a first unit vector function based on the first motion vector sequence obtained from the amount of movement of the spatial control input device and a first cumulative vector function based on the first motion vector sequence obtained from the amount of movement of the spatial control input device;

comparing at least one of the first generated unit vector function and the first generated cumulative vector function with the second motion vector sequence corresponding to the basic motion pattern; and identifying the spatial motion pattern of the spatial control input device based on a result of the comparing step.

18. The spatial motion pattern input method according to claim 16, wherein said converting step comprises:

converting said amount of spatial movement into the first motion vector sequence by giving the values, obtained by sampling in time said amount of spatial movement composed of at least two amounts sensed at said sensing step, to a conversion table in which unit vectors and angles are entered for the amount of spatial movement one after another as specified values.

19. The spatial motion pattern input method according to claim 16, wherein:

said sensing step further comprises sensing the amount of rotation on an axis perpendicular to each pair of two axes on which the amount of movements of said spatial control input device is sensed; and said converting step further comprises extracting the amount of movement obtained by subtracting said amount of rotation on the axis from the relevant amount of movements on two axes of said spatial control input device sensed at said sensing step, on the basis of the step of sensing the amount of rotation.

20. The spatial motion pattern input method according to claim 16, wherein:

said controlling step displays the shape of the spatial motion pattern recognized at said comprising step.

* * * * *